(12) United States Patent
Li et al.

(10) Patent No.: US 11,469,655 B2
(45) Date of Patent: Oct. 11, 2022

(54) DRIVING DEVICE, LASER MEASUREMENT DEVICE AND MOVABLE PLATFORM

(71) Applicant: SZ DJI TECHNOLOGY CO., LTD., Shenzhen (CN)

(72) Inventors: Zheyang Li, Shenzhen (CN); Huai Huang, Shenzhen (CN); Jin Zhao, Shenzhen (CN); Xiaoping Hong, Shenzhen (CN); Peng Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 527 days.

(21) Appl. No.: 16/665,822

(22) Filed: Oct. 28, 2019

(65) Prior Publication Data
US 2020/0067390 A1 Feb. 27, 2020

Related U.S. Application Data

(63) Continuation of application No. PCT/CN2017/082522, filed on Apr. 28, 2017.

(51) Int. Cl.
*H02K 16/02* (2006.01)
*G02B 7/18* (2021.01)
*G02B 26/10* (2006.01)
*G02B 27/09* (2006.01)

(52) U.S. Cl.
CPC .......... *H02K 16/02* (2013.01); *G02B 7/1805* (2013.01); *G02B 26/10* (2013.01); *G02B 27/0972* (2013.01)

(58) Field of Classification Search
CPC ..... H02K 16/02; H02K 16/025; G02B 7/1805
See application file for complete search history.

(56) References Cited

U.S. PATENT DOCUMENTS

2008/0197730 A1    8/2008   Himmelmann et al.

FOREIGN PATENT DOCUMENTS

| CN | 101657954 A | 2/2010 |
| CN | 101951091 A | 1/2011 |
| CN | 201918867 U | 8/2011 |
| CN | 202219375 U | 5/2012 |
| CN | 102955251 A | 3/2013 |

(Continued)

OTHER PUBLICATIONS

The World Intellectual Property Organization (WIPO) International Search Report for PCT/CN2017/082522 dated Jan. 29, 2018 6 pages.

*Primary Examiner* — Ryan D Howard
(74) *Attorney, Agent, or Firm* — Anova Law Group, PLLC

(57) ABSTRACT

A driving device includes two rotor assemblies, a stator assembly, and a positioning assembly. Each rotor assembly includes a rotation axis and a rotor. The rotor includes a hollow chamber. The two rotor assemblies include a first rotor assembly and a second rotor assembly, a rotation axis of the first rotor assembly is parallel with a rotation axis of the second rotor assembly, a rotor of the first rotor assembly is at least partially embedded in a chamber of a rotor of the second rotor assembly. The stator assembly is surroundingly disposed at an outer side of the two rotor assemblies and drives a rotor. The rotor driven by the stator assembly causes another rotor of one of the first rotor assembly and the second rotor assembly to rotate. The positioning assembly is located outside of the rotors, and limits the rotors to rotate around corresponding fixed rotation axes.

20 Claims, 20 Drawing Sheets

(56) References Cited

FOREIGN PATENT DOCUMENTS

| | | | |
|---|---|---|---|
| CN | 103542054 | A | 1/2014 |
| CN | 103545988 | A | 1/2014 |
| CN | 105281523 | A | 1/2016 |
| CN | 204992818 | U | 1/2016 |
| CN | 106443955 | A | 2/2017 |
| JP | 2009223133 | A | 10/2009 |
| JP | 2012257427 | A | 12/2012 |
| JP | 2013198307 | A | 9/2013 |
| WO | 2017043387 | A1 | 3/2017 |

DRIVING DEVICE, LASER MEASUREMENT DEVICE AND MOVABLE PLATFORM

CROSS-REFERENCE TO RELATED APPLICATION

This application is a continuation application of International Application No. PCT/CN2017/082522, filed on Apr. 28, 2017, the entire content of which is incorporated herein by reference.

TECHNICAL FIELD

The present disclosure relates to the technology field of electric motors and, more particularly, to a driving device, a laser measurement device, and a movable platform.

BACKGROUND

With the continuous advancement of technology, unmanned movable platform, such as unmanned aerial vehicles ("UAVs"), have gained increasingly wider applications.

Currently, to realize multiple functions of the unmanned movable platform, electric motors are typically used to drive a load. For example, laser measurement devices may be used to avoid obstacles. Using laser measurement device as an example, the laser measurement device typically includes two prisms and an electric motor configured to drive the prisms to perform relative rotation. The two prisms are driven respectively by the electric motor to form different relative locations and relative angles, thereby changing the direction of the laser beam and performing scanning. The electric motor may perform rotational driving through relative rotations between a rotor and a stator. One of the stator and the rotor may be a powered coil, the other one may be a magnetic element. When the coil is powered, the stator and the rotor may generate relative rotation under the function of the electromagnetic field, and may drive the load to rotate.

However, in the current manner of electric motor driving the load, the structure is relatively complex. The device occupies a relatively large space, which is disadvantageous to miniaturize the device.

SUMMARY

In accordance with an aspect of the present disclosure, there is provided a driving device including two rotor assemblies, a stator assembly, and a positioning assembly. Each of the two rotor assemblies includes a rotation axis and a rotor configured to rotate around the rotation axis. The rotor includes a hollow chamber having a hollow part configured to receive a load. The two rotor assemblies include a first rotor assembly and a second rotor assembly, a rotation axis of the first rotor assembly is parallel with a rotation axis of the second rotor assembly, a rotor of the first rotor assembly is at least partially embedded in a chamber of a rotor of the second rotor assembly. The stator assembly is surroundingly disposed at an outer side of at least one of the two rotor assemblies and is configured to drive a rotor of one of the first rotor assembly and the second rotor assembly. The rotor driven by the stator assembly is configured to cause a rotor of the other one of the first rotor assembly and the second rotor assembly to rotate. The positioning assembly is located at an outer side of the rotors of the two rotor assemblies, and is configured to limit the rotors to respectively rotate around corresponding fixed rotation axes.

In accordance with another aspect of the present disclosure, there is provided a laser measurement device including an emitter configured to emit a light beam and a receiving unit configured to receive the light beam. The laser measurement device also includes a driving device including two rotor assemblies, a stator assembly, and a positioning assembly. Each of the two rotor assemblies includes a rotation axis and a rotor configured to rotate around the rotation axis. The rotor includes a hollow chamber having a hollow part configured to receive a load. The two rotor assemblies include a first rotor assembly and a second rotor assembly, a rotation axis of the first rotor assembly is parallel with a rotation axis of the second rotor assembly, a rotor of the first rotor assembly is at least partially embedded in a chamber of a rotor of the second rotor assembly. The stator assembly is surroundingly disposed at an outer side of at least one of the two rotor assemblies and is configured to drive a rotor of one of the first rotor assembly and the second rotor assembly. The rotor driven by the stator assembly is configured to cause a rotor of the other one of the first rotor assembly and the second rotor assembly to rotate. The positioning assembly is located at an outer side of the rotors of the two rotor assemblies, and is configured to limit the rotors to respectively rotate around corresponding fixed rotation axes.

In accordance with another aspect of the present disclosure, there is provided a movable platform including a platform body and a laser measurement device mounted on the platform body. The laser measurement device includes an emitter configured to emit a light beam and a receiving unit configured to receive the light beam. The laser measurement device also includes a driving device including two rotor assemblies, a stator assembly, and a positioning assembly. Each of the two rotor assemblies includes a rotation axis and a rotor configured to rotate around the rotation axis. The rotor includes a hollow chamber having a hollow part configured to receive a load. The two rotor assemblies include a first rotor assembly and a second rotor assembly, a rotation axis of the first rotor assembly is parallel with a rotation axis of the second rotor assembly, a rotor of the first rotor assembly is at least partially embedded in a chamber of a rotor of the second rotor assembly. The stator assembly is surroundingly disposed at an outer side of at least one of the two rotor assemblies and is configured to drive a rotor of one of the first rotor assembly and the second rotor assembly. The rotor driven by the stator assembly is configured to cause a rotor of the other one of the first rotor assembly and the second rotor assembly to rotate. The positioning assembly is located at an outer side of the rotors of the two rotor assemblies, and is configured to limit the rotors to respectively rotate around corresponding fixed rotation axes.

According to the driving device, laser measurement device, and movable platform of the present disclosure, the driving device includes two rotor assemblies, a stator assembly, and a positioning assembly. Each rotor assembly includes a rotation axis and a rotor configured to rotate around the rotation axis. The rotor includes a hollow chamber. Within the chamber is a hollow part for receiving a load. The two rotor assemblies include a first rotor assembly and a second rotor assembly. The rotation axis of the first rotor assembly is parallel with the rotation axis of the second rotor assembly. The rotor of the first rotor assembly is at least partially nested in the chamber of the rotor of the second rotor assembly. The stator assembly is surroundingly disposed at the outer side of the of rotor assembly, and is configured to drive the rotor of one of the first rotor assembly and the second rotor assembly to rotate. The rotor drives the rotor of the other one of the first rotor assembly and the second rotor assembly. The positioning assembly is located at the outer side of the rotors and is configured to limit the rotors to respectively rotate around fixed rotation axes. As such, because the driving device includes only one stator assembly, and the two rotor assemblies have a portion that is nested in each other, the overall structure of the driving device is relatively simpler, and the size of the appearance is relatively small.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

DESCRIPTIONS OF LABELS OF ACCOMPANYING DRAWINGS

Figure 1:
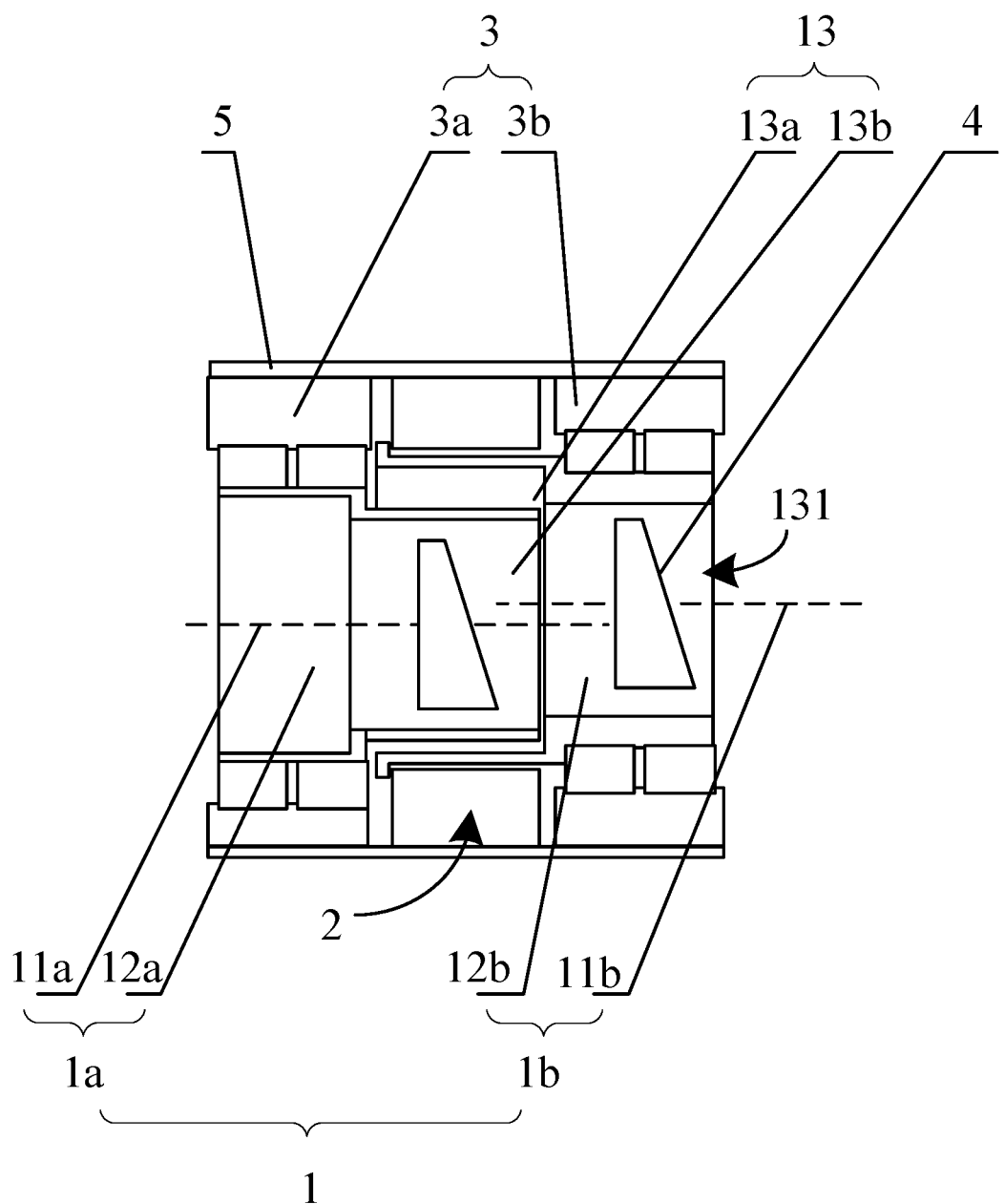
FIG. 1 is an illustration of a structure of a driving device, according to an example embodiment.

1, 71—rotor assembly;
2—stator assembly;
3—positioning assembly;
4—load;
5—housing;
1*a*—first rotor assembly;
1*b*—second rotor assembly;
3*a*—first positioning assembly;
3*b*—second positioning assembly;
11, 11*a*, 11*b*, 611*a*, 611*b*, 711—rotation axis;
12, 12*a*, 12*b*, 60*a*, 60*b*—rotor;
13—chamber;
131—hollow part;
14—friction pad;
121*a*—first rotation member;
122*a*—second rotation member;
123*a*, 123*b*, 123*c*—magnet yoke;
124*a*, 124*b*, 124*c*—magnet;
1231*b*, 1231*c*—first portion;
1232*b*, 1232*c*—second portion;
31—positioning frame;
32—bearing;
321—first bearing;
322—second bearing;
331—first axis shoulder;
332—second axis shoulder;
333—third axis shoulder;
334—fourth axis shoulder;
100, 200—prism;
100*a*—first prism;
100*b*—second prism;
101—first optical surface;
102—second optical surface;
201*a*, 201*b*, 201*c*, 201*d*—sub-optical surface;
L1—incident light;
L2, L3—exit light;
712—inner wall;
72—counterweight block;
72*a*, 72*b*, 72*c*, 72*d*—sub-counterweight member.

DETAILED DESCRIPTION OF THE EMBODIMENTS

To more clearly illustrate the purpose, technical solution, and advantage of the present disclosure, technical solutions of the present disclosure will be described in detail with reference to the drawings, in which the same numbers refer to the same or similar elements unless otherwise specified. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless. When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component. The terms "perpendicular," "horizontal," "vertical," "left," "right," "up," "upward," "upwardly," "down," "downward," "downwardly," and similar expressions used herein are merely intended for describing relative positional relationship.

In addition, the singular forms "a," "an," and "the" are intended to include the plural forms as well, unless the context indicates otherwise. The terms "comprise," "comprising," "include," and the like specify the presence of stated features, steps, operations, elements, and/or components but do not preclude the presence or addition of one or more other features, steps, operations, elements, components, and/or groups. The term "and/or" used herein includes any suitable combination of one or more related items listed. For example, A and/or B can mean A only, A and B, and B only. The symbol "/" means "or" between the related items separated by the symbol. The phrase "at least one of" A, B, or C encompasses all combinations of A, B, and C, such as A only, B only, C only, A and B, B and C, A and C, and A, B, and C. In this regard, the term "and/or" may be interpreted as "at least one of." For example, A and/or B can mean at least one of A or B. The term "communicatively couple(d)" or "communicatively connect(ed)" indicates that related items are coupled or connected through a communication channel, such as a wired or wireless communication channel. The term "unit" may include a hardware component, a software component, or a combination thereof.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

As described herein, the terms used in the specification of the present disclosure are intended to describe example embodiments, instead of limiting the present disclosure. In addition, the singular forms "a," "an," "said," and "the" are intended to include the plural forms as well, unless the context indicates otherwise.

FIG. 1 is an illustration of a structure of a driving device, according to an embodiment of the present disclosure. As shown in FIG. 1, the driving device of the present disclosure may include two rotor assemblies 1, a stator assembly 2, and a positioning assembly 3. Each rotor assembly may include a rotation axis 11 and a rotor 12 configured to rotate around the rotation axis 11. The rotor 12 may include a chamber 13 having an inner hollow space. Each chamber 13 may include a hollow part 131 configured to receive a load 4.

The two rotor assemblies 1 may include a first rotor assembly 1a and a second rotor assembly 1b. A rotation axis 11a of the first rotor assembly 1a and a rotation axis 11b of the second rotor assembly 1b may be parallel with one another. The rotor 12a of the first rotor assembly 1a may be at least partially embedded in the chamber of the rotor 12b of the second rotor assembly 1b. The stator assembly 2 may be surroundingly disposed at an outer side of the rotor assembly 1, and may be configured to drive a rotor of one of the first rotor assembly 1a and the second rotor assembly 1b. The rotor may drive another rotor of the other one of the first rotor assembly 1a and the second rotor assembly 1b to rotate. The positioning assembly 3 may be located at an outer side of the rotor 12, and may be configured to limit the rotors 12 to respectively rotate around the fixed rotation axes 11.

Specifically, the stator assembly 2 and the rotor assembly 1 of the driving device may generate relative rotation under the magnetic force of the magnetic field, and the driving device may drive the load 4 to rotate using the relative rotation between the rotor assembly 1 and the stator assembly 2. For example, one of the rotor assembly 1 and the stator assembly 2 may include a ferrite core wound with a coil, and the other one may include a magnetic body. When an electric current passes through the coil, a change in the magnetic field may be generated, and the magnetic body and the coil may rotate relative to one another under the magnetic force.

The driving device may include two rotor assemblies. When driven by the stator assembly 2, the rotors 12 of the two rotor assemblies may rotate around the respective rotation axis 11, and may drive the load 4 received in each of the rotors 12 to rotate together. The load 4 may be disposed in the chamber 13a of the rotor 12a, or may be disposed in the chamber 13b of the rotor 12b. The load 4 may be an optical element through which a light beam can pass. For the convenience of the load 4 to operate, the rotor 12 typically includes chamber 13 having a hollow structure. The load 4 may be fixed in the hollow part 131 disposed in the chamber 13. The rotor 12 may be located at an inner side, and the stator assembly 2 may be located at an outer side of the rotor 12. As such, structures such as the rotor and the stator may not block and affect the load 4 that is located at the middle location.

The two rotor assemblies of the driving device may drive different loads to rotate respectively. The two rotor assemblies 1a and 1b may be configured to nest in each other. That is, the rotation axes 11a and 11b of the first rotor assembly 1a and the second rotor assembly 1b may be parallel with one another, and the rotor 12a of the first rotor assembly 1a may be at least partially nested inside the hollow chamber of the rotor 12b of the second rotor assembly 1b. Because the two rotor assemblies are nested in each other, as compared to an existing driving device having two independently operated motors, the stator assembly configured to drive the rotor assembly to rotate may drive the rotor of one of the two rotor assemblies to drive. The rotor of the other rotor assembly may be caused to rotate by the rotation of the rotor that is directly driven by the stator assembly. As this moment, when driven by the rotation of each of the two rotor assemblies, the load 4 may rotate together and accomplish corresponding operations.

Because the two rotor assemblies 1 have portions that are embedded with one another, and the stator assembly 2 may drive one of the rotor assemblies to rotate, as compared to an existing driving device having two independently operated motors, there is no need to use two independent stator assemblies to drive the two rotor assemblies. In addition, the overall length of the two rotor assemblies in the axial direction is reduced, thereby simplifying the overall structure of the driving device and reducing the size of the driving device, which is advantageous for the miniaturization of the device.

In order to support and position the rotors 12 of different rotor assemblies, the positions of the rotors in the axial direction of the rotation axis and in a direction perpendicular to the axial direction of the rotation axis may be limited. The positioning assembly 3 may include a first positioning assembly 3a and a second positioning assembly 3b. The first positioning assembly 3a and the second positioning assembly 3b may be located at an outer side of the corresponding rotor. For example, the first positioning assembly 3a may be located at an outer side of the rotor 12a of the first rotor assembly 1a. The second positioning assembly 3b may be located at an outer side of the rotor 12b of the second rotor assembly 1b. The first positioning assembly 3a and the second positioning assembly 3b may be configured to limit the rotors 12 to respectively rotate around the fixed rotation axes 11.

It is noted that because the rotation axis 11a and the rotation axis 11b are parallel with one another, the directions pointed by the two rotation axes are consistent. Therefore, a direction perpendicular to the axial direction is a direction that is perpendicular to both the rotation axis 11a and the rotation axis 11b. A direction that is parallel with the axial direction is a direction that is parallel with both the rotation axis 11a and the rotation axis 11b.

In addition, the rotation axis 11a of the first rotor assembly 1a and the rotation axis 11b of the second rotor assembly 1b are typically not on the same straight line. As such, the rotor 12a of the first rotor assembly 1a and the rotor 12b of the second rotor assembly 1b rotate around different rotation axes, and may form different rotation angles.

Figure 2:
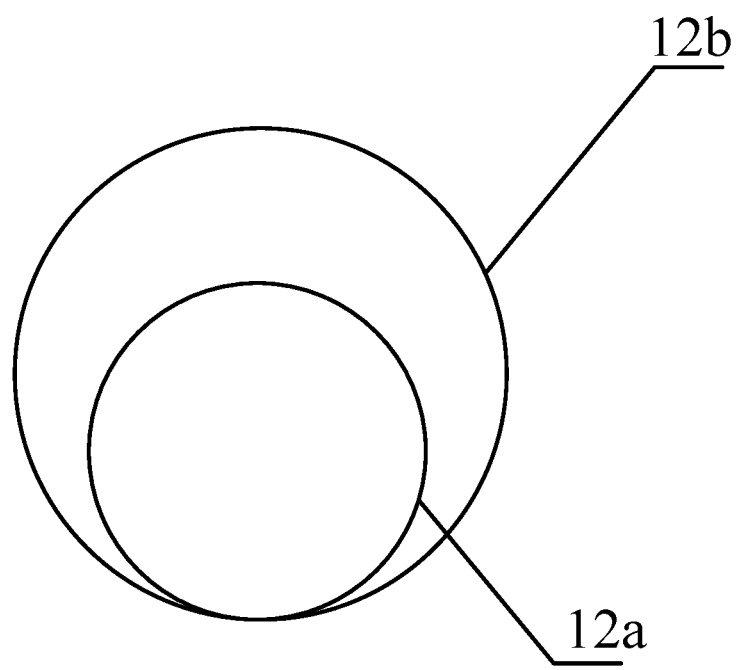
FIG. 2 is an illustration of a structure of a transmission manner between two rotor assemblies, according to an example embodiment.

To reduce the volume of the overall device as much as possible, one motor is adopted to drive two rotor assemblies to rotate. In addition, in order to make the rotation angular velocities different for the two rotor assemblies, the driving motor directly drives one of the rotor assemblies to rotate, and this rotor assembly then drives the other rotor assembly to rotate. Because a rotor of one rotor assembly rotates under the driving of the other rotor assembly, the two rotor assemblies need parts that mutually contact one another or mutually affect one another, to transmit a force between the two rotor assemblies. FIG. 2 is a schematic illustration of a structure of a transmission manner between the two rotor assemblies according to an embodiment of the present disclosure. As shown in FIG. 1 and FIG. 2, for example, when the two rotor assemblies transmit forces through a contacting manner, in some embodiments, a contact transmission may be configured between the rotor 12a of the first rotor assembly 1a and the rotor 12b of the second rotor assembly 1b. In addition, the linear velocities at the contacting point between the rotor 12a of the first rotor assembly 1a and the rotor 12b of the second rotor assembly 1b may be the same.

Specifically, in the above embodiment, because both of the rotors 12a and 12b of the first rotor assembly 1a and the second rotor assembly 1b have a hollow chamber, by configuring the distance between the rotation axis 11a of the first rotor assembly 1a and the rotation axis 11b of the second rotor assembly 1b, the outer periphery of the rotor 12a of the first rotor assembly 1a and an inner wall of the chamber 13b of the rotor 12b of the second rotor assembly 1b may directly contact with each other at a certain point or may indirectly contact each other through a force transmission mechanism. Because shape of the periphery of the rotor and the shape of the inner wall of the chamber are typically a shape of a revolving body, the rotor 12a of the first rotor assembly 1a and the chamber 13b of the rotor 12b of the second rotor assembly 1b may for a contact transmission manner such as rolling. The direct or indirect contacting point between the outer periphery of the rotor 12a of the first rotor assembly 1a and the inner wall of the chamber 13b of the rotor 12b of the second rotor assembly 1b is the contacting point. As such, when one of the two rotor assemblies rotates, the other one of the two rotor assemblies may be caused to rotate through the direct or indirect contact between the rotor outer periphery and the inner wall of the chamber of the rotor between the two rotor assemblies and the friction force at the contacting point.

The linear velocities of the rotor 12a of the first rotor assembly 1a and the rotor 12b of the second rotor assembly 1b at the contacting point are maintained to be the same. Because the two rotors are embedded with one another, the two rotors include different outer diameters. When the linear velocities at the contacting point are the same, the two rotors may have different rotation angular velocities. That is, the two rotors may rotate at different angular velocities during rotations. At this moment, the load 4 received in the hollow part of the rotor may rotate at different angular velocities, and may form different relative angles.

Figure 3:
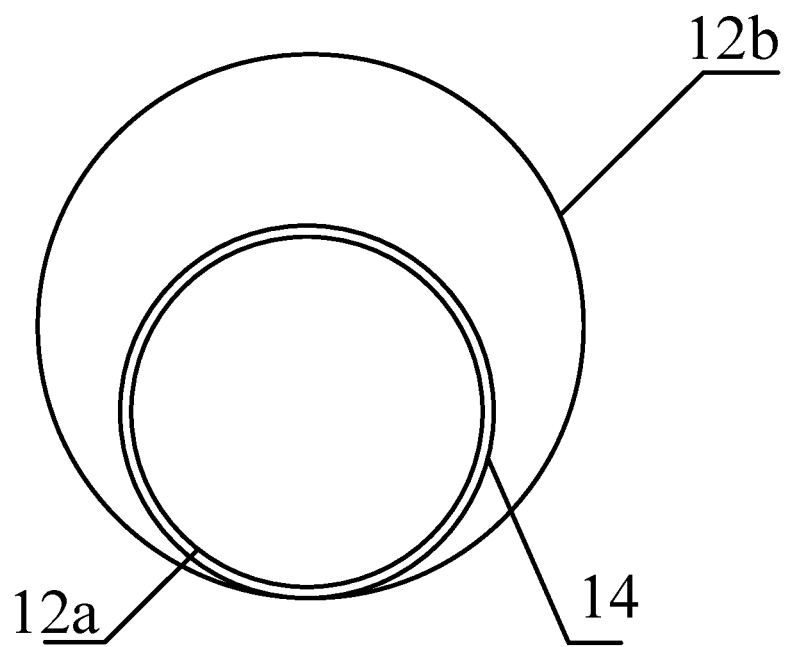
FIG. 3 is an illustration of a structure of a transmission manner between two rotor assemblies, according to another example embodiment.

Further, FIG. 3 is a schematic illustration of a structure of another transmission manner between the two rotors, according to an embodiment of the present disclosure. As shown in FIG. 1 and FIG. 3, as an embodiment of contact transmission, between the rotor 12a of the first rotor assembly 1a and the rotor 12b of the second rotor assembly 1b, connection roll may be realized through static friction. Specifically, between the rotor 12a of the first rotor assembly 1a and the rotor 12b of the second rotor assembly 1b, a friction pad 14 may be provided. The rotor 12a of the first rotor assembly 1a and the rotor 12b of the second rotor assembly 1b may be rollingly connected through the friction force of the friction pad 14. The friction pad 14 may be configured to provide a sufficient friction force to ensure that the rotor 12a of the first rotor assembly 1a and the rotor 12b of the second rotor assembly 1b always synchronously rotate through maintaining a rolling contact point via the static friction force, and relative sliding may not occur.

As another embodiment of the rolling connection, the rotor 12a of the first rotor assembly 1a and the rotor 12b of the second rotor assembly 1b may use mesh transmission at the contacting point. Specifically, the outer periphery of the rotor 12a of the first rotor assembly 1a and the inner wall of the chamber 13b of the rotor 12b of the second rotor assembly 1b may both include correspondingly disposed gear teeth. When the gear teeth on the two rotors mesh with each other, the two rotors may maintain synchronous rotation at a same linear velocity. The rolling contact point is the meshing point between the gear teeth of the rotor 12a of the first rotor assembly 1a and the rotor 12b of the second rotor assembly 1b.

It should be understood that whatever manner used to cause one rotor of the two rotor assemblies to be driven by another rotor to rotate, the manner need to ensure that the rotation state of the two rotors are synchronous. That is, the two rotors have the same linear velocity or have a predetermined relationship, and the phenomenon of one rotor rotates while the other rotor does not rotate may not occur.

In some embodiments, the rotor assembly 1, stator assembly 2, and the positioning assembly 3 may have multiple different relative locations and connection relationships depending on the specific different structures. Next, these are described in details.

Figure 4:
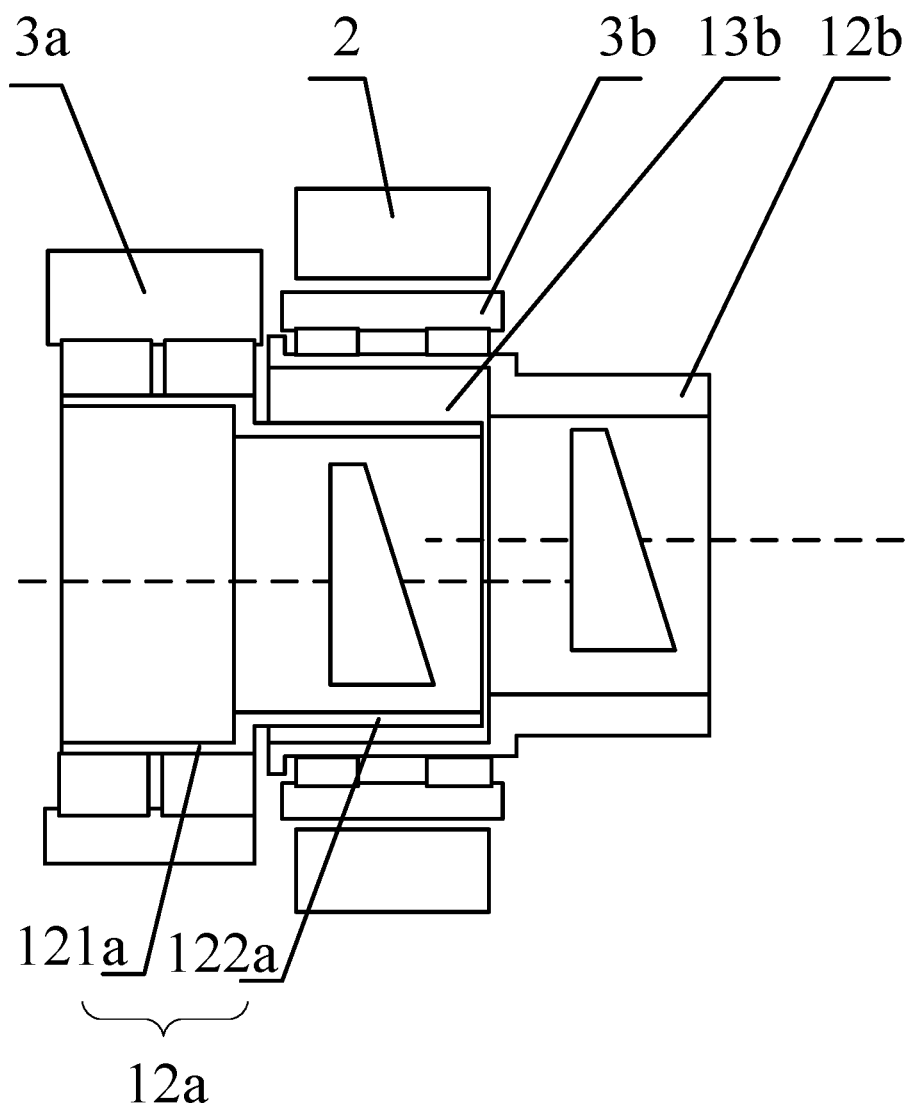
FIG. 4 is an illustration of a structure of a driving device, according to another example embodiment.

For example, for the rotor assembly 1, the rotor 12a of the first rotor assembly 1a may be fully embedded in the rotor 12b of the second rotor assembly 1b, or may be partially embedded in the rotor 12b of the second rotor assembly 1b. Typically, for the convenience of respectively supporting and positioning the rotors of the two rotor assemblies, the form of the rotor 12a of the first rotor assembly 1a partially embedded in the rotor 12b of the second rotor assembly 1b is usually adopted. FIG. 4 is a schematic illustration of a structure of another driving device, according to an embodiment of the present disclosure. As shown in FIG. 4, at this moment, specifically, the rotor 12a of the first rotor assembly 1a may be divided in the axial direction a first rotation member 121a embedded in the chamber 13 of the second rotor assembly 1b and a second rotation member 122a not embedded in the chamber 13b. At this moment, the rotor 12a of the first rotor assembly 1a may be supported through the structure of the second rotation member 122a, and the transmission between the two rotors may be performed through the first rotation member 121a.

The stator assembly 2 may be surroundingly disposed at an outer side of the rotors of the first rotor assembly 1a and the second rotor assembly 1b, or be surroundingly disposed at an outer side of only one of the rotors, or be surroundingly disposed at an outer side of only a portion of the rotor. For the convenience of manufacturing and assembling, typically, the stator assembly 2 is surroundingly disposed at an outer side of only a portion of the rotor 12. In some embodiments, when the rotor 12a of the first rotor assembly 1a includes the first rotation member 121a and the second rotation member 122a, the stator assembly 2 may be located only at the outer side of the first rotation member 121a, i.e., located at an outer side of the embedding region of the first rotor assembly 1a and the second rotor assembly 1b. Unless otherwise noted below, the following descriptions are based on the assumption that the stator assembly 2 is located at an outer side of the first rotation member 121a.

Specifically, the stator of the stator assembly 2 configured to generate a magnetic force with the rotor may have multiple different specific structures. For example, the stator assembly 2 may include a ring-shaped stator disposed surrounding an outer side of the rotor. Such a ring-shaped stator may provide a driving force to the rotor in every direction of an outer periphery of the circumference of the rotor. Or, the stator assembly 2 may include at least two stators that are separately disposed. The stator may be axially symmetric or center symmetric relative to the rotation axis 11a of the first rotor assembly 1a (when the stator assembly 2 is located at the outer side of the second rotation member 122a, the stator may be axially symmetric or center symmetric relative to the rotation axis 11b of the second rotor assembly 1b). The separately disposed stators may also provide a driving force to the rotor. Other structures and elements may be disposed in the space between two adjacent stators.

In the embodiment where the stator assembly 2 is located at an outer side of the first rotor assembly 1a, the positioning assembly 3 may have multiple different specific structures and realization forms. For example, as a preferred embodiment, the first positioning assembly 3a may be located at an outer side of the second rotation member 122a. At this moment, the first positioning assembly 3a may be located at a part of the rotor 12a of the first rotor assembly 1a that is not embedded with the second rotor assembly 1b, thereby realizing support for the rotor 12a of the first rotor assembly 1a, and limiting the rotor 12a of the first rotor assembly 1a to rotate around the fixed rotation axis.

Correspondingly, when using the second positioning assembly 3b to support the rotor 12b of the second rotor assembly 1b, the second positioning assembly 3b may correspondingly have multiple configuration manners.

For example, as shown in FIG. 4, as a first optional configuration manner for the second positioning assembly, the second positioning assembly 3b may be located at an outer side of the stator assembly 2, and may be separately disposed with the stator assembly 2. At this moment, the second positioning assembly 3b may be located at the outer side of a part of the rotor 12b of the second rotor assembly 1b that is embedded with the rotor 12a of the first rotor assembly 1a, and may support and limit the position of the rotor 12b of the second rotor assembly 1b. Because the second positioning assembly 3b typically includes a moving member that rotates along with the rotor, the second positioning assembly 3b may maintain a predetermined gap or distance from the stator assembly 2, such that the second positioning assembly 3b may not affect the stator assembly 2.

At this moment, the second positioning assembly 3b may include the following detailed structures. For example, the second positioning assembly 3b may include a ring-shaped positioning member. The ring-shaped positioning member may be fixed at a circumferential side of the outer periphery of the rotor 12b of the second rotor assembly 1b, thereby limiting the position of and protecting the rotor 12b, and providing a relatively excellent structural integrity.

Alternatively, the second positioning assembly 3b may include at least two positioning members configured to be axially symmetric or center symmetric relative to the rotation axis 11a of the first rotor assembly 1a and the rotation axis 12b of the second rotor assembly 1b. As such, other structures and elements may be disposed between two adjacent positioning members, which is convenient for the assembling and mounting of the entire driving device.

It should be understood, that the structure of the first positioning assembly 3a may be similar to the structure of the second positioning assembly 3b, which is not repeated.

Figure 5:
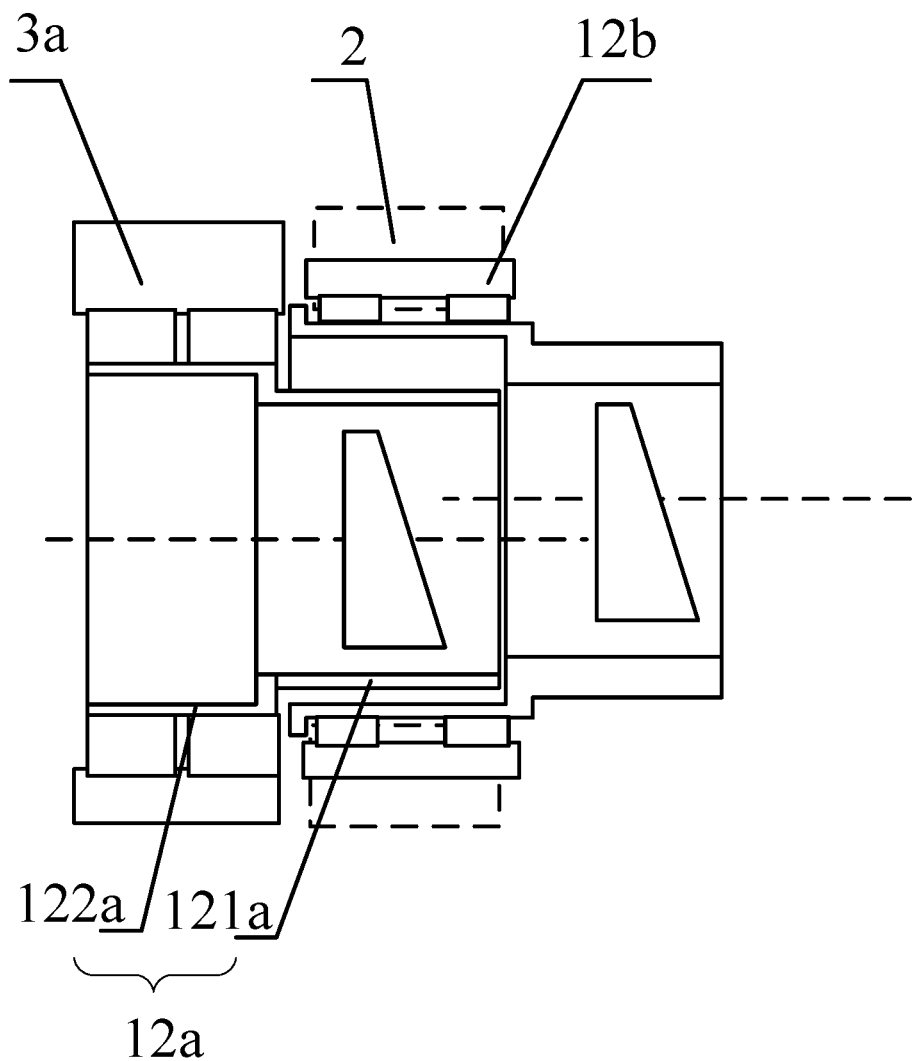
FIG. 5 is a schematic illustration of a configuration of a positioning assembly, according to an example embodiment.
Figure 6:
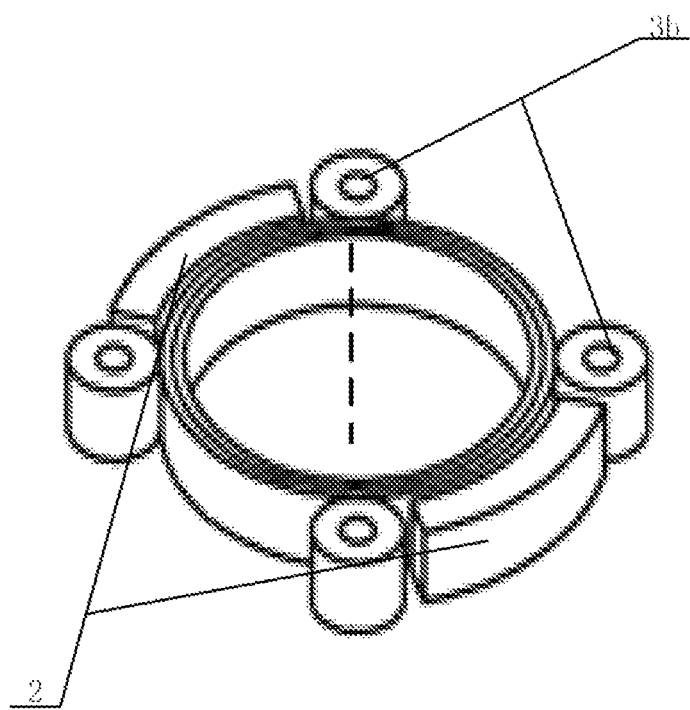
FIG. 6 is an illustration of a structure of a configuration of a stator and a positioning member, according to an example embodiment.

FIG. 5 is a configuration manner of another positioning assembly, according to an embodiment of the present disclosure. As shown in FIG. 1 and FIG. 5, as another configuration manner of the second positioning assembly, the relative location of the second positioning assembly 3b and the rotor assembly may be similar to the first optional manner described above. The difference is, the positioning member of the second positioning assembly 3b and the stator of the stator assembly 2 are located at locations that have substantially the same radial distances to the rotation axis, rather than at the inner side of the stator assembly 2. At this moment, the second positioning assembly 3b may include at least two positioning members. The stator assembly 2 may include at least two stators. The at least two stators and the at least two positioning members may be at least partially alternately disposed around the rotation axis. To avoid interference between the stator assembly 2 and the second positioning assembly 3b, the second positioning assembly 3b no longer adopts an integral ring-shaped positioning member. Rather, the stator assembly 2 and the second positioning assembly 3b may both include multiple independent positioning members or independent stators, and the stators and the positioning members may be alternately disposed. FIG. 6 is a schematic illustration of a structure of the alternately disposed stators and the positioning members, according to an embodiment of the present disclosure. As shown in FIG. 6, the second positioning assembly 3b and the stator assembly 2 may be interspersed with one another, and separately disposed surrounding an outer side of the rotor.

The detailed arrangement manner of the stators and the positioning members may be: a stator is disposed between two adjacent positioning members, or a positioning member is disposed between two adjacent rotors, or any combination of these two arrangement manners, which is not repeated.

Figure 7:
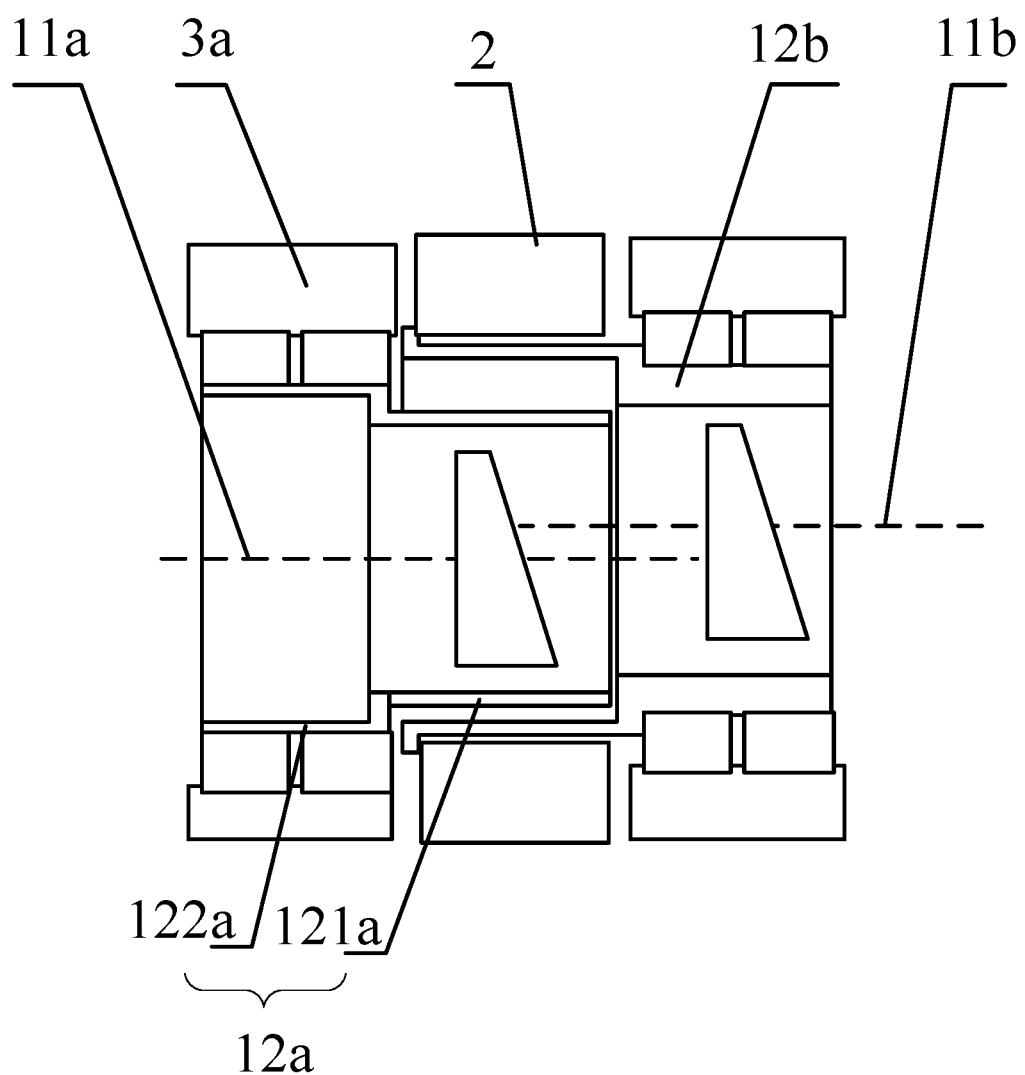
FIG. 7 is a schematic illustration of a configuration of a positioning assembly, according to another example embodiment.

FIG. 7 is a schematic illustration of a configuration manner of another positioning assembly according to an embodiment of the present disclosure. As shown in FIG. 7, as the third optional configuration manner of the second positioning assembly, the second positioning assembly 3b and the stator assembly may be orderly arranged along the axial direction of the rotation axis 11a or 11b, and the first positioning assembly 3a and the second positioning assembly 3b may be located respectively on two sides of the axial direction of the stator assembly 2. At this moment, the second positioning assembly 3b may be disposed in the rotor 12b of the second rotor assembly 1b, and may be located at an outer side of the part of the rotor 12b that is embedded with the first rotor assembly 1a.

Similar to the above-described first configuration manner of the second positioning assembly, the second positioning assembly 3a may include at least two positioning members disposed to be axially symmetric or center symmetric relative to the rotation axis 11a of the first rotor assembly 1a or the rotation axis 11b of the second rotor assembly 1b, or may include only an integral ring-shaped positioning member, or other possible structures, etc., which is not repeated.

In another aspect, in order to be driven by the stator assembly through a magnetic force, and to be supported and position limited by the positioning assembly, the first rotor assembly 1a and the second rotor assembly 1b may correspondingly have multiple detailed different structures. Net, the various possible structures of the rotor assembly 1 are described in detail.

Figure 8:
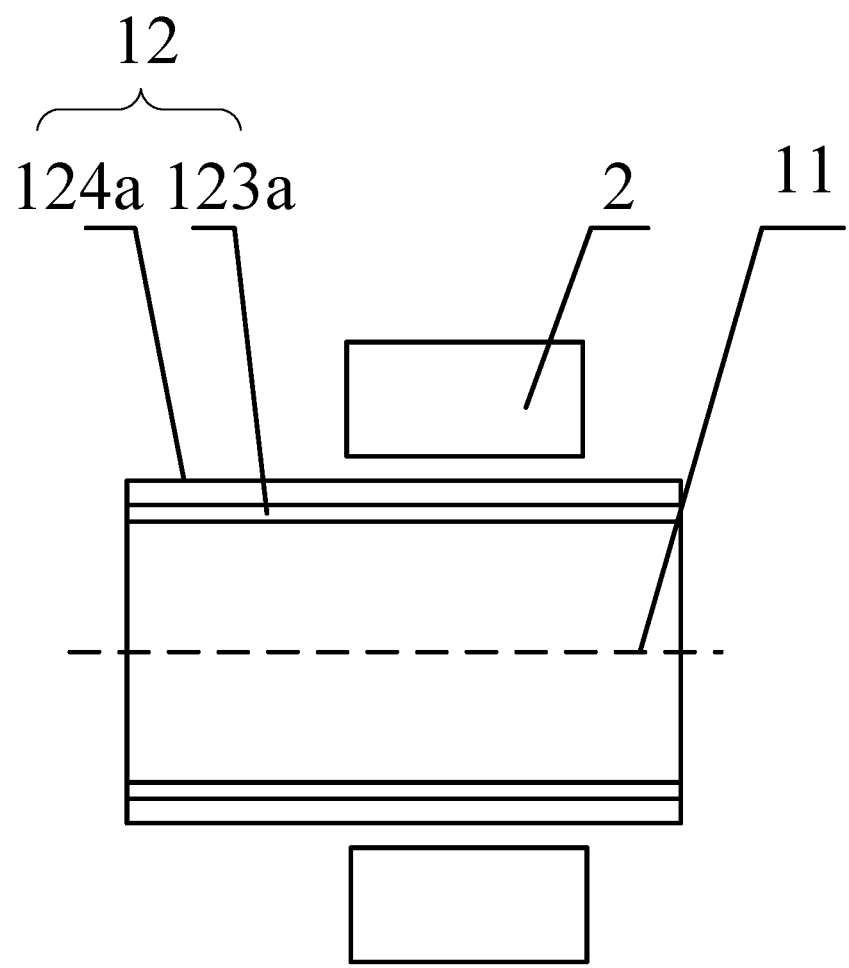
FIG. 8 is an illustration of a structure of a rotor assembly, according to an example embodiment.

FIG. 8 is a schematic illustration of a structure of a rotor assembly according to an embodiment of the present disclosure. As shown in FIG. 8, in a possible realization manner of the rotor assembly 1, the rotor 12 may include a magnet yoke 123a and at least one magnet 124a fixedly connected with the magnet yoke 123a. The magnet 124a may be disposed to surround an outer side of the magnet yoke 123a. The magnet 124a may interact with the coil and ferrite core of the stator assembly 2, and may rotate under the magnetic force. The magnet yoke 123a may be configured to transmit the magnetic flux lines to increase the scope of the magnetic field of the magnet 124a, and improve the direction of the magnetic field, etc. In generally, the magnet yoke 123a may be made by a soft iron or a soft magnetic alloy that has a relatively high magnetic conductivity. The magnet yoke 123a may typically have a structure of a circular cylindrical shape or other similar cylindrical shapes. The magnet 124a may be located at an outer side of the magnet yoke 123a. For example, the magnet 124a may be located at an outer circumferential surface of the magnet yoke 123a.

Further, the lengths of the magnet 124a and the magnet yoke 123a along the axial direction are generally relatively long. In addition, at least a portion of the magnet 124a and the magnet yoke 123a may be located at the inner side of the stator assembly 2. At this moment, the magnet 124a and the magnet yoke 123a may include at least a portion that faces the stator assembly 2, and the rest portions may face the first positioning assembly 3a or the second positioning assembly 3b. The magnet yoke 123a may be a structure that is connected with the first positioning assembly 3a or the second positioning assembly 3b, or may be configured to generate a magnetic interaction with the stator assembly 2, and may be driven by the stator assembly 2.

In this embodiment, the magnet 124a may be both connected or interact with the positioning assembly 3 and the stator assembly 2. The structures and shapes of the magnet 124a and the magnet yoke 123a may be relatively simple, which may be, for example, a simple circular cylindrical shape.

Figure 9A:
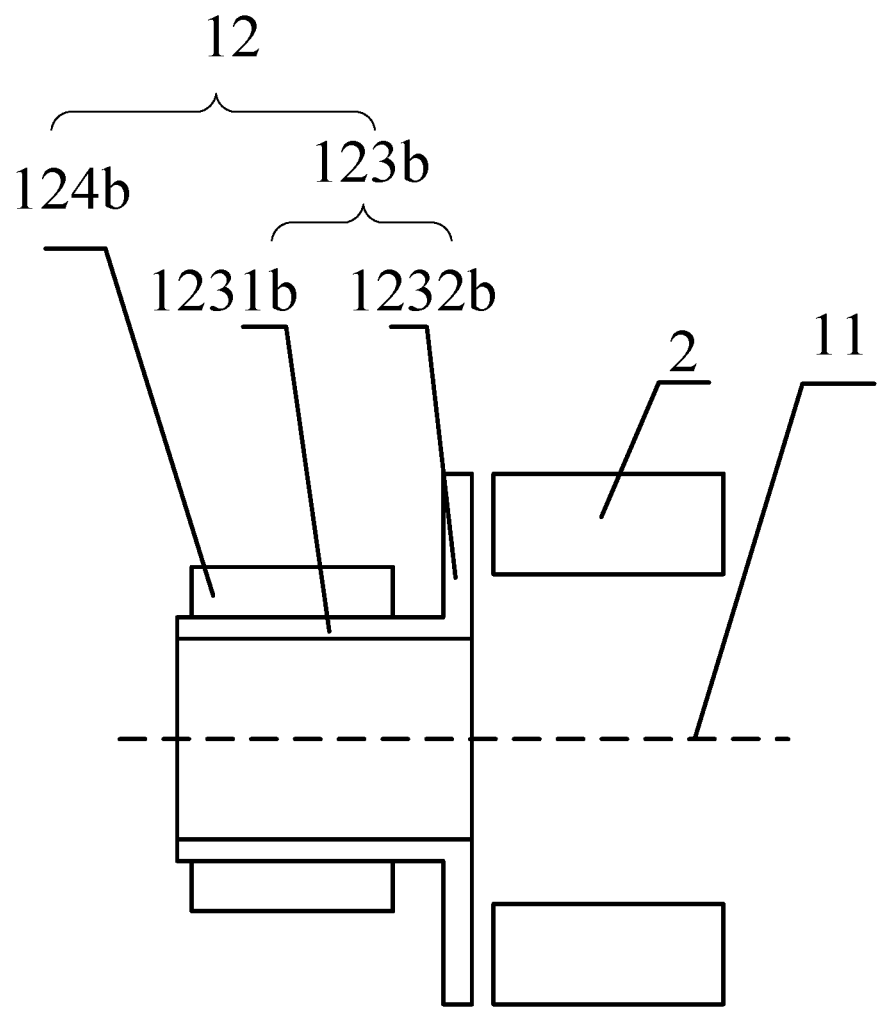
FIG. 9*a* is an illustration of a structure of a rotor assembly, according to another example embodiment.

FIG. 9a is a schematic illustration of a structure of another rotor assembly, according to an embodiment of the present disclosure. As shown in FIG. 9a, in another realization manner of the rotor assembly, the rotor 12 may include at least one magnet 124b. The at least one magnet 124b and the stator assembly 2 may be orderly arranged along the direction of the rotation axis. At this moment, the magnet 124b and the stator assembly 2 are not located at the same location relative to the axial direction of the rotation axis. Rather, they are staggeringly arranged in the direction of the axial direction of the rotation axis. Therefore, the magnetic field of the stator assembly 2 cannot directly affect the magnet 124b. Rather, elements such as a magnet yoke may be used to transmit the magnetic flux lines of the magnetic field.

Specifically, when the magnet yoke is used to transmit the magnetic flux lines of the magnet 124b, the rotor 12 may also include a magnet yoke 123b coupled with the magnet 124b. The magnet yoke 123b may include a first portion 1231b that surrounds the rotation axis and a second portion 1232b coupled with the first portion 1231b. The first portion 1231b may be coupled with at least one magnet 124b. At this moment, the first portion 1231b is coupled with the magnet 124b, and therefore, can transmit the magnetic flux lines generated by the magnet 124b to other parts, such as the second portion 1232b coupled with the first portion 1231b. The second portion 1232b may amplify the scope of the magnetic field of the magnet 124b to generate interactions with other magnetic elements.

The second portion for amplifying the scope of the magnetic field of the magnet may need to extend to a range where the second portion can have magnetic field interaction with the stator assembly 2. For example, the first portion 1231b of the magnet yoke 123b may extend in the axial direction along the rotation axis, and the second portion 1232b of the magnet yoke 123b may extend in the radial direction of the rotation axis. At this moment, the second portion 1232b of the magnet yoke 123b may extend in the radial direction of the rotation axis, and may extend to a side of the stator assembly 2 where the stator is located. At this moment, the stator of the stator assembly 2 and the second portion 1232b of the magnet yoke 123b may generate a magnetic field through which they may interact with one another. The stator of the stator assembly 2 may drive the second portion 1232b of the magnet yoke 123b to rotate.

Figure 9B:
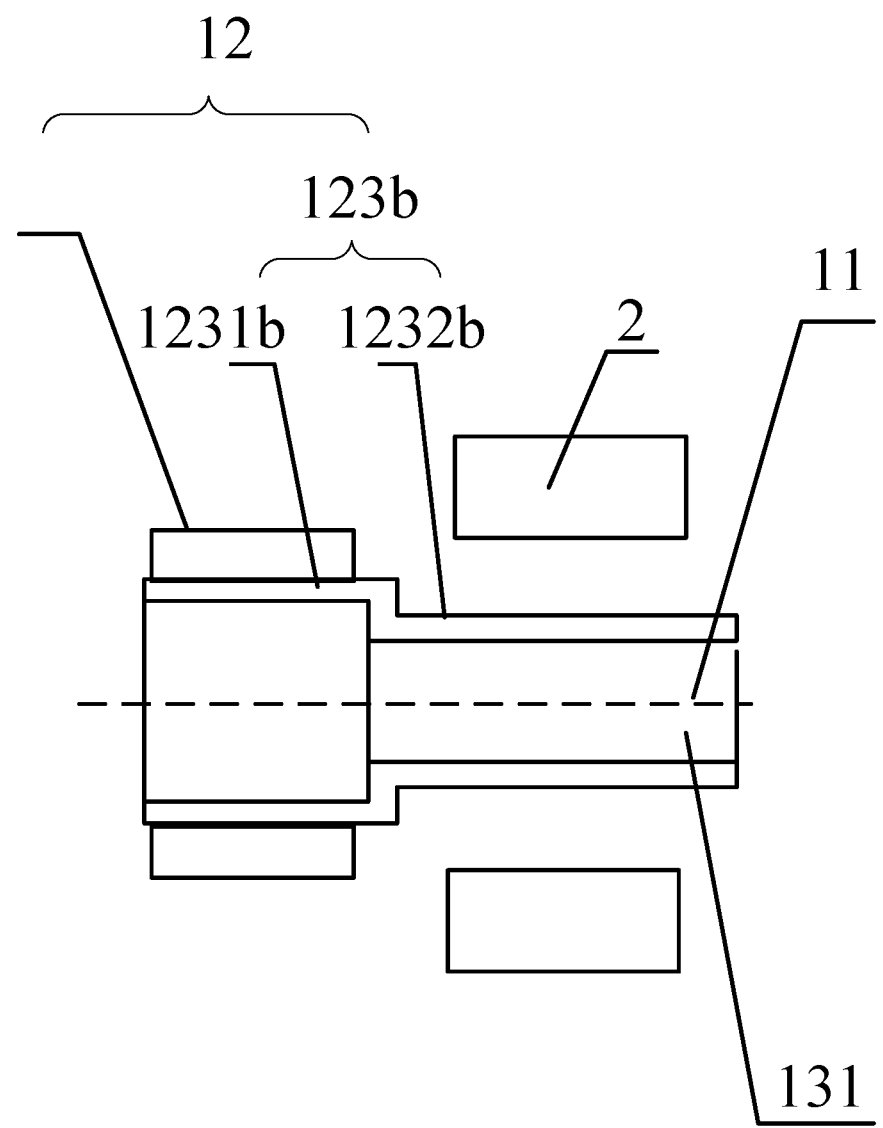
FIG. 9*b* is an illustration of a structure of a rotor assembly, according to another example embodiment.

FIG. 9b is a schematic illustration of a structure of another rotor assembly, according to an embodiment of the present disclosure. As shown in FIG. 9b, additionally, the second portion 1232b may extend to a side of the stator assembly 2 that faces the rotation axis. At this moment, the first portion 1231b of the magnet yoke 121 may be coupled with the magnet 123b, and the second portion 1232b may be coupled with the first portion 1231b. As such, the second portion 1232b may be configured to transmit the magnetic flux lines of the magnet 124b, and may generate a magnetic field with the stator of the stator assembly 2 through which they interact with one another. At this moment, the stator assembly 2 may apply a magnetic field effect at the second portion 1232b of the magnet yoke 123b, and may cause the entire rotor 12a of the first rotor assembly 1a to rotate.

It should be understood that different structures of the magnet yoke 123b may be selected based on whether the rotor 12, where the magnet yoke 123b is located, is a rotor of the first rotor assembly or a rotor of the second rotor assembly. For example, when the first portion 1231b of the magnet yoke 123b can extend in the axial direction of the rotation axis, and the second portion 1232b of the magnet yoke 123b can extend in the radial direction of the rotation axis, the rotor 12 where the magnet yoke 123b is located is typically located in the second rotor assembly 1b. At this moment, because the second portion 1232b extends toward a side where the stator is located, and because an inner side of the second portion 1232b typically includes the rotor 12b of the first rotor assembly 1a embedded therein, typically, the hollow part 131 is formed in the first portion 1231b of the magnet yoke 123b.

When the second portion 1232b of the magnet yoke 123b extends to a side of the stator assembly 2 facing the rotation axis, the rotor where the magnet yoke 123b is located can be located in the first rotor assembly or the second rotor assembly. In the meantime, the hollow part 131 for receiving the load 4 may be formed in the second portion 1232b of the magnet yoke 123b or in the first portion 1231b of the magnet yoke 123b.

Figure 10:
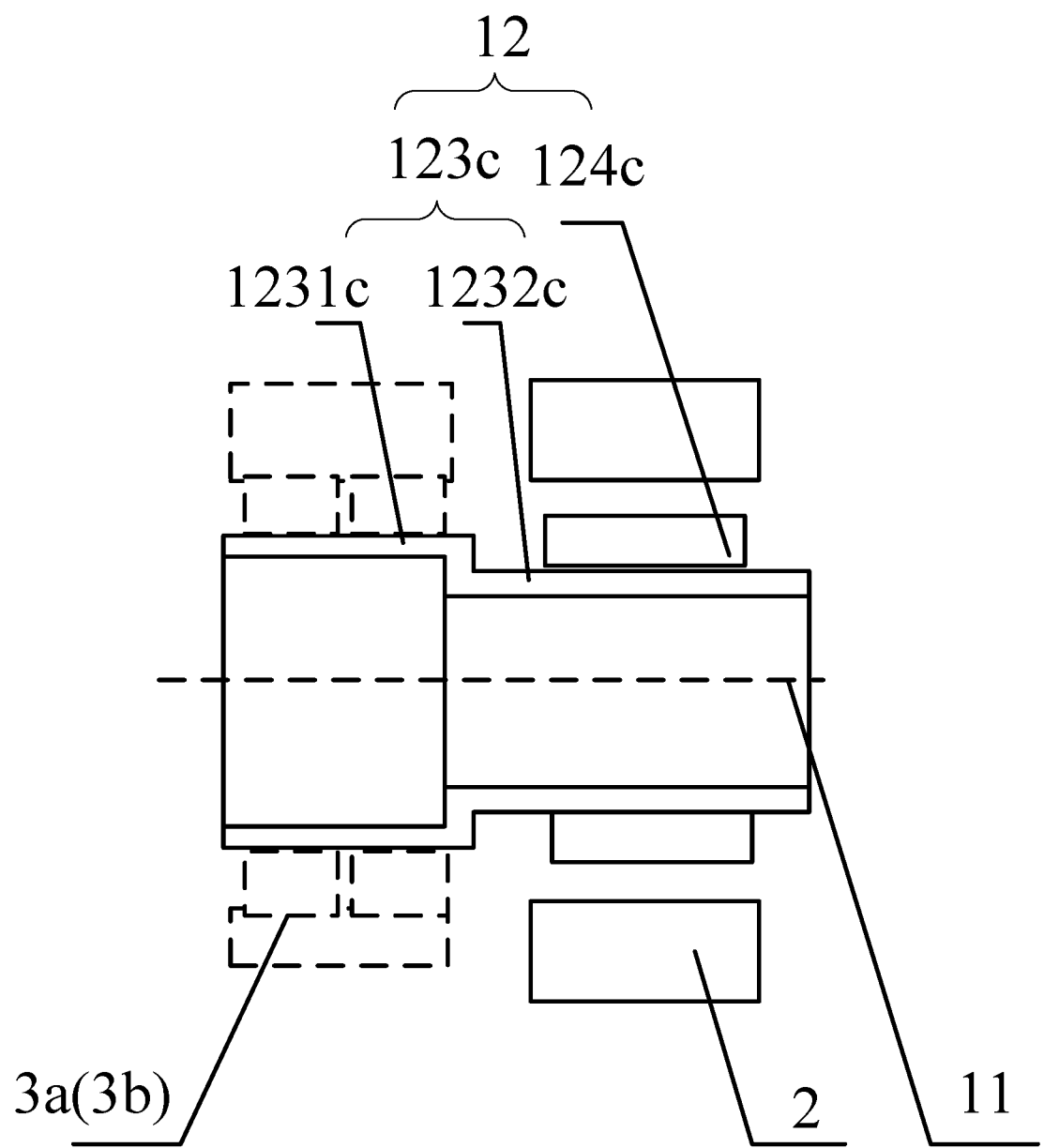
FIG. 10 is an illustration of a structure of a fourth rotor assembly, according to another example embodiment.

FIG. 10 is a schematic illustration of a structure of a fourth rotor assembly, according to an embodiment of the present disclosure. As shown in FIG. 10, in a third possible realization manner of the rotor assembly, the rotor 12 may include at least one magnet 124c. The at least one magnet 124c may be located at an inner side of the stator assembly 2. At this moment, the magnet 124c of the rotor 12 and the stator assembly 2 may be located at the same location in the axial direction of the rotation axis.

As an optional detailed structure, the rotor 12 may include a magnet yoke 123c coupled with the magnet 124c. The magnet yoke 123c may include a first portion 1231c surrounding the rotation axis and a second portion 1232c coupled with the first portion 1231c. The first portion 1231c of the magnet yoke 123c may be coupled with at least one magnet 124c, thereby restraining and amplifying the scope of the magnetic field effect of the magnet 124c. The second portion 1232c may extend to a side of the positioning assembly 3 facing the rotation axis, and may function as a structural element for connecting with the positioning assembly 3.

In some embodiments, the first portion 1231c of the magnet yoke 123c may extend in the radial direction of the rotation axis or extend in the axial direction of the rotation axis, thereby extending to an inner side of the stator assembly 2, or a side location of the stator assembly 2, and may rotate under the magnetic force between the stator assembly 2.

It should be understood that the structure of the above-described rotor assembly 1 may be the first rotor assembly 1a or the second rotor assembly 1b. The detailed structure and configuration manner may be set based on whether the rotor assembly is the first rotor assembly 1a or the second rotor assembly 1b, which is not repeated.

A person having ordinary skills in the art can appreciate, the detailed structure, relative location, and configuration manner of each of the stator assembly 2, the positioning assembly 3, and the rotor assembly 1 may be freely selected and combined, as long as the driving device thus formed can perform normal assembling and normal operation, which is not limited by the present disclosure.

In addition, in order to limit the location of the rotor 12 of the rotor assembly 1 in the axial direction along the rotation axis 11, the positioning assembly 3 may be provided with a guiding rail. A portion of the rotor assembly 1 may abut against and connect with an inner side of the guiding rail. Alternatively, the rotor assembly 1 may be provided with a guiding rail, and a portion of the positioning assembly 3 may abut against and connect with the inner side of the guiding rail.

The guiding rail may reduce the sway of the rotor assembly in the direction along the rotation axis. When the rotor of the rotor assembly 1 has a tendency to move in the direction along the rotation axis, the guiding rail may abut against the rotor assembly 1 or the positioning assembly 3 to limit the rotor assembly 1 within the range of the guiding rail.

Further, as an optional embodiment, in order to avoid the damage that may be caused by the surface of the rotor assembly 1 or the positioning assembly 3 rub with the guiding rail, the surface of the guiding rail may be provided with a protection pad or may be provided with a lubricating oil or grease. The protection pad may provide a buffer function, to avoid the surface of the rotor assembly 1 and the positioning assembly 3 to directly contact or impact with the guiding rail. The lubricating oil and lubricating grease may reduce the friction between the rotor assembly 1 or the positioning assembly 3 and the guiding rail, to ensure that the rotor assembly 1 can smoothly rotate.

While the positioning assembly 3 provides support to and limit the position of the rotor assembly 1, in the meantime, in order to enable the rotor assembly to smoothly rotate when driven by the stator assembly 2, the rotor assembly 1 may form a ring-shaped structure or a portion of a ring-shaped structure. The positioning assembly 3 may include multiple rolling elements located at an outer side of the rotor assembly 1 and a positioning frame located at an outer side of the rolling elements. The positioning frame may be rollingly connected with the rotor assembly 1 through the rolling elements. Because the friction force of the rolling elements when rolling is relatively small, the positioning frame of the positioning assembly 3 may form a rolling connection based on the rolling elements and the ring-shaped structure of the rotor assembly 1, to ensure that the rotor assembly 1 can rotate normally.

Specifically, in order to support and position the rolling elements, and to avoid the rolling elements located between the positioning frame and the rotor assembly 1 sling out along its own axial direction, a surface of the rotor assembly 1 facing the positioning frame may eb disposed with a first groove. A surface of the positioning frame facing the rotor assembly 1 may be disposed with a second groove. The first groove and the second groove may be disposed to face one another to together form the guiding rail for receiving the rolling elements. The rolling elements can roll inside the guiding rail. The first groove and the second groove can respectively support and limit the position of the rolling elements from two sides of the axial direction of the rolling elements, thereby avoiding the rolling elements sliding out of the guiding rail.

When the rolling elements provides the rolling connection between the positioning frame and the rotor assembly, to avoid a single rolling element interfering the rolling of the other rolling elements, a separating ring configured to fix the location of a rolling element in the direction of the rotation axis may be provided between the rotor assembly 1 and the positioning frame. The separating ring may divide or separate a ring-shaped space between the rotor assembly 1 and the positioning frame into multiple individual regions. Each region may only receive one rolling element. Therefore, the rolling process of each rolling element is independent, and may not affect the rolling process of other rolling elements.

Further, a through hole may be provided on the separating ring to receive the rolling element. The size of the through hole is typically slightly larger than the diameter of the rolling element. Thus, the through hole can only receive an individual rolling element, thereby effectively separating the rolling elements.

Figure 11:
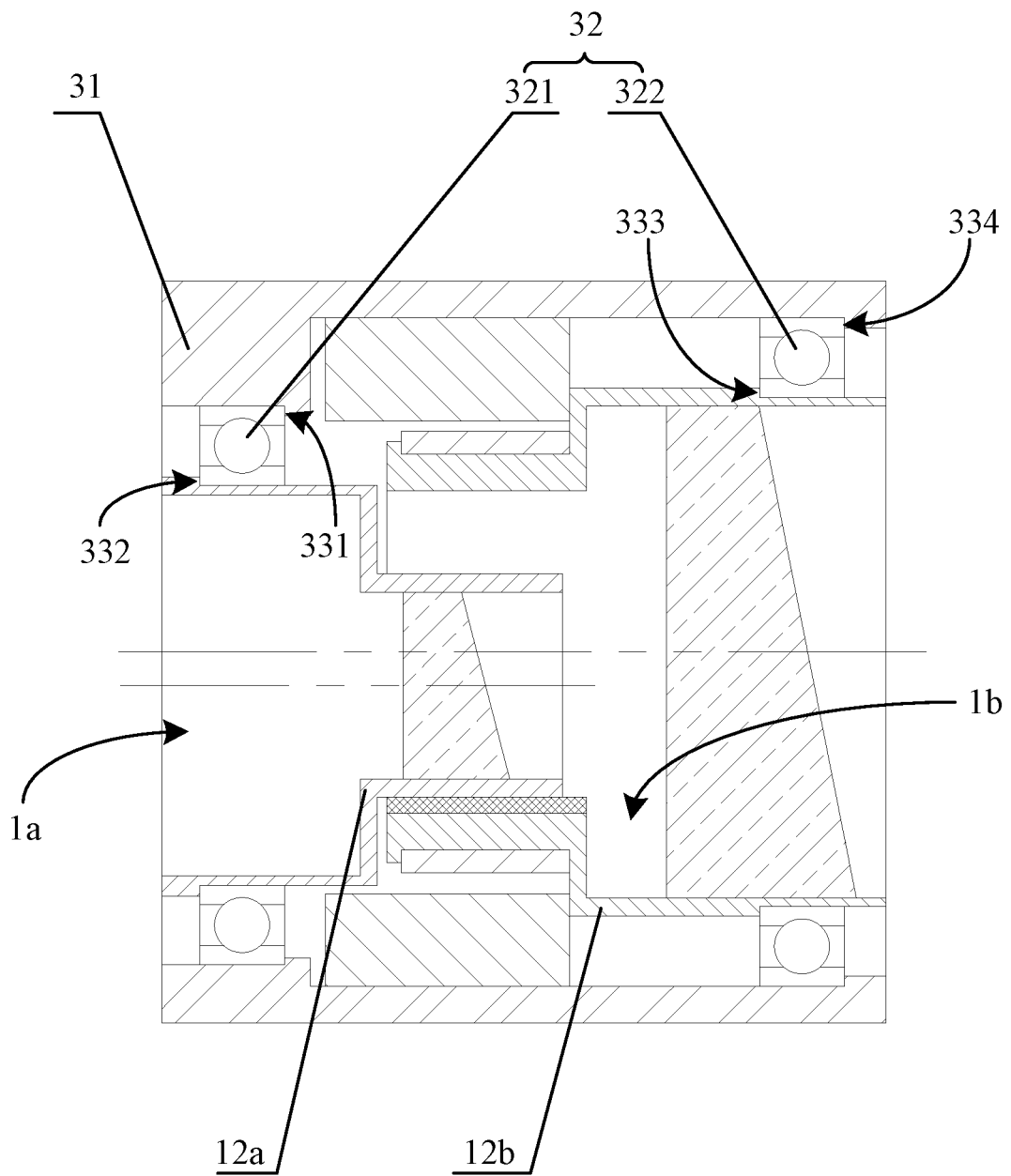
FIG. 11 is an illustration of a structure of a driving device, according to another example embodiment.

In addition, the positioning assembly 3 for fixing the rotor assembly 1 may include typically used structures such as a bearing. Because an inner ring and an outer ring of the bearing may be connected with different structures respectively, while the bearing provides support, the bearing can also enable the different structures connected with the inner ring and the outer ring to freely perform relative rotation. FIG. 11 is a schematic diagram of a structure of another driving device, according to an embodiment of the present disclosure. As shown in FIG. 11, when a structural element such as a bearing is used as a portion of the positioning assembly, the positioning assembly 3 may include a positioning frame 31 and multiple bearings 32. The positioning frame 31 may be surroundingly disposed at an outer side of the rotor assembly 1, to function as a supporting structure for connecting with an external structure such as the housing of the driving device. The multiple bearings 32 may include a first bearing 321 and a second bearing 322.

The first bearing 321 may be disposed between the rotor 12a of the first rotor assembly 1a and the positioning frame 31, the second bearing 322 may be disposed between the rotor 12b of the second rotor assembly 1b and the positioning frame 31.

At this moment, because there are portions that are embedded with one another between the rotor 12a of the first rotor assembly 1a and the rotor 12b of the second rotor assembly 1b, the first bearing 321 and the rotor 12b may provide support to two ends of the rotor 12a of the first rotor assembly 1a respectively. The second bearing 322 and the rotor 12a may provide support to two ends of the rotor 12b of the second rotor assembly 1b respectively. The rotor 12a of the first rotor assembly 1a and the rotor 12b of the second rotor assembly 1b may support each other at the location where portions of each are embedded. In a conventional driving device formed by two motors in the current technology, because the need of pre-tensioning of the bearing, each rotor of the motor need two bearings to provide support. Therefore, four bearings in total may be needed. As such, the driving device of the present embodiment that uses bearings to provide positioning and support, as compared to currently available technology, the number of bearings is fewer, and the structure is simpler.

Because the positioning assembly 3 includes a bearing 32, and because the bearing needs to undergo a certain pre-tensioning during assembling, to eliminate a radial clearance between the inner ring and the outer ring of the bearing, and to avoid the generation of axial sway during the rotation of the bearing, the positioning frame 31, the rotor 12a of the first rotor assembly 1a, and the rotor 12b of the second rotor assembly 1b can all include an axis shoulder abutting against an end surface of the bearing 32. The axis shoulder may action on the end surface of the bearing 32, thereby applying a certain axial force to the end surface of the bearing 32, thereby eliminating the clearance between the inner and outer rings of the bearing 32.

The bearing 32 may include an inner ring and an outer ring that can rotate relative to one another. The end surface of the inner ring abutted against by the axis shoulder and the end surface of the outer ring abutted against by the axis shoulder may be located on different sides of the bearing 32. As such, on the same bearing, the force of the axis shoulder experienced by the inner ring and the force of the axis shoulder experienced by the outer ring have opposite directions, thereby causing the inner ring and the outer ring of the bearing to axially move toward each other, eliminating the clearance between the inner ring and the outer ring of the bearing, and avoiding the sway or axial endplay between the inner ring and the outer ring.

Specifically, the rotor 12a of the first rotor assembly 1a and the positioning frame 31 may be connected through the first bearing 321. The end surface of the first side of the outer ring of the first bearing 321 may abut against a first axis shoulder 331 provided on the positioning frame 31. The end surface of the second side of the inner ring of the first bearing 321 may abut against a second axis shoulder 332 provided on the rotor 12a of the first rotor assembly 1a. A third axis shoulder 333 provided on the rotor 12b of the second rotor assembly 1b may abut against the end surface of the first side of the inner ring of the second bearing 322. A fourth axis shoulder 334 provided on the positioning frame 31 may abut against the end surface of the second side of the outer ring of the second bearing 322. As such, when the positioning frame 31 moves toward an axial side of the bearing 32, the action force may be transmitted to other bearings and rotors through the abutting between the axis shoulder and the end surfaces of the bearing 32, thereby realizing the pre-tensioning of the first bearing 321 and the second bearing 322. Specifically, the pre-tensioning force of the bearing 32 may be provided by the magnetic force.

In addition, in some embodiments, the driving device may include the load 4. The load 4 may be fixedly connected inside the hollow part 131, and can synchronously rotate with the rotor assembly 1. In some embodiments, the load 4 may be an optical element, and may be configured for reflecting a light beam, refract a light beam, or performing other optical processing, etc.

Further, the optical element carried by the first rotor assembly 1a and the optical element carried by the second rotor assembly 1b may have different rotation angular velocities. As such, a relative rotation may occur between the optical elements carried by the two rotor assemblies, and different phases and angles may be formed, thereby causing the light beams passing through the optical elements to have rotation of different angles or other changes. For example, the relative rotation of the optical elements may cause the light beams passing therethrough to rotate based on predetermined angles or predetermined paths.

In an embodiment, the optical element may be a prism or a lens.

Further, when the optical element is the prism, in some embodiments, the thickness of the prism in the radial direction may vary. As such, when the prism rotates along with the rotor assembly, the light beam incident on one side of the prism may be refracted by the prism. When the rotor assembly rotates to different angles, the light beam may be refracted by the prism in different directions.

In some embodiments, the optical element may have an asymmetric shape. Further, in some embodiments, the driving device may include a plurality of counterweight blocks. The counterweight blocks may be disposed in the hollow part of the rotor and may be configured to improve the dynamic balance when the optical element rotates with the rotor assembly.

Specifically, the counterweight blocks may be disposed in the hollow part in multiple manners. For example, the locations of the projections of the counterweight blocks on the optical element in a direction perpendicular to the rotation axis on the inner wall of the hollow part may be discontinuous. Alternatively, the locations of the projections of the counterweight blocks on the optical element in a direction perpendicular to the rotation axis on the inner wall of the hollow part may be continuous. Alternatively, the counterweight blocks at different locations in the direction of the rotation axis may have different volumes and weights. Alternatively, the counterweight blocks may be disposed between the optical element and the inner wall of the hollow part, and may be configured to fix the optical element to the inner wall of the hollow part, and may improve the dynamic balance when the optical element rotates together with the rotor assembly.

Alternatively, in some embodiments, the counterweight blocks may not be disposed inside the hollow part. Rather, the counterweight blocks may be disposed at other locations other than the hollow part, which is not limited by the present disclosure.

Alternatively, in some embodiments, the dynamic balance of the optical element and the rotor assembly rotating together may be improved not through adding the counterweight blocks. Rather, the dynamic balance of the optical element and the rotor assembly rotating together may be improved through reducing some weight at the periphery of the optical element. For example, a notch may be formed at a periphery of a portion of the optical element having a relatively large thickness to improve the dynamic balance when the optical element rotates together with the rotor assembly. Of course, in some embodiments, the dynamic balance of the optical element rotating together with the rotor assembly may be improved by combining the counterweight blocks and reducing some weight at the periphery of the optical element.

Figure 12:
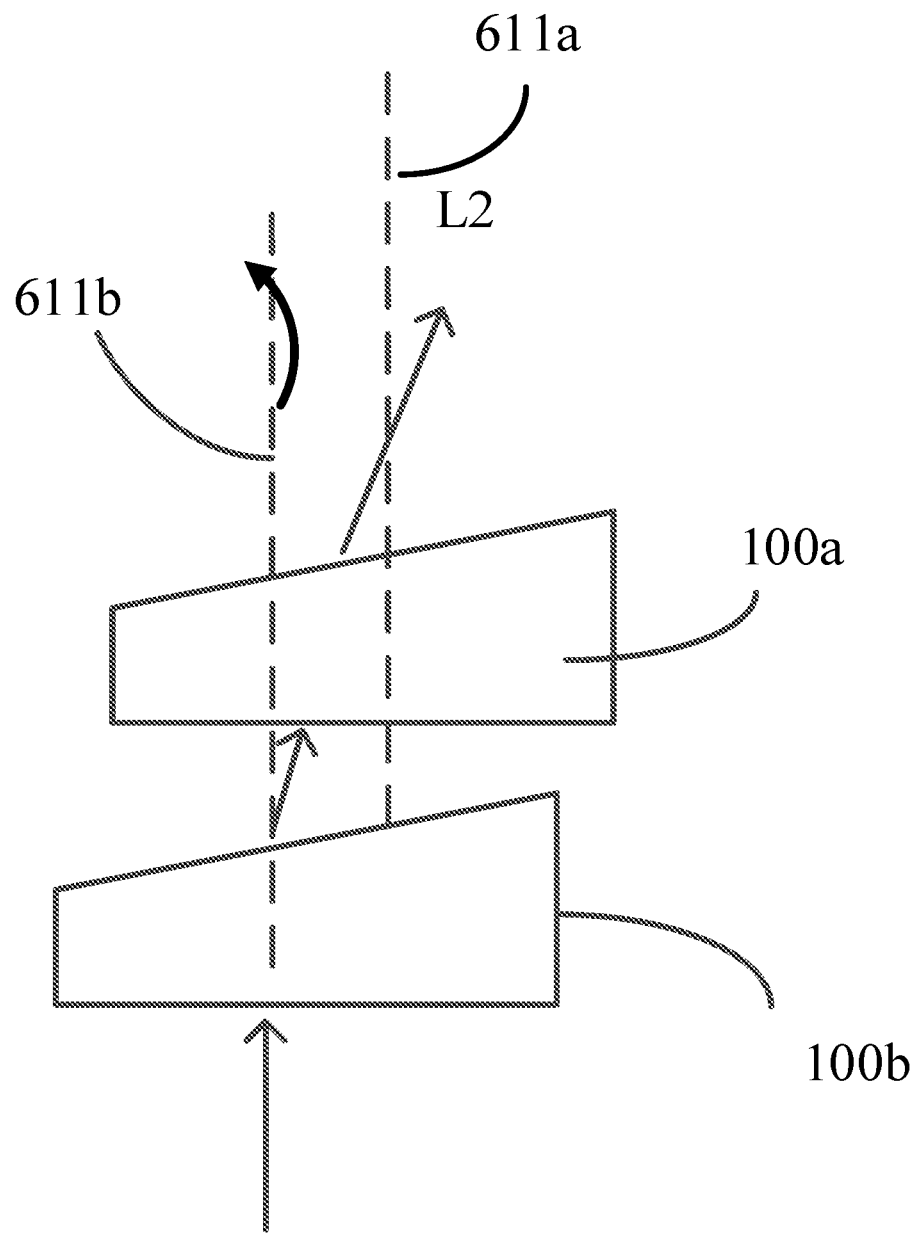
FIG. 12 is an illustration of a structure of a load when the load is a prism, according to an example embodiment.
Figure 13:
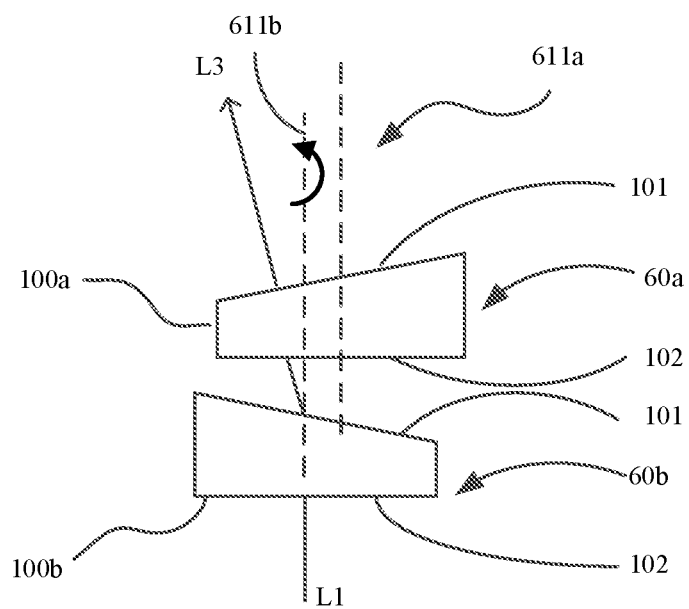
FIG. 13 is a schematic illustration of a rotation of the load shown in FIG. 12, according to an example embodiment.

FIG. 12 is a schematic illustration of a structure of a load when the load is a prism, according to an embodiment of the present disclosure. FIG. 13 is a schematic illustration of a rotation of the load shown in FIG. 12. As shown in FIG. 12 and FIG. 13, the load has a shape of the prisms fixed to the hollow parts of rotors 60a, 60b of two rotor assemblies. Corresponding to two rotors 60a, 60b, a first prism 100a and a second prism 100b may be included. The first prism 100a may be fixed to an inner wall 612 of the hollow part of the rotor 60a, the second prism 100b may be fixed to an inner wall 512 of the hollow part of the rotor 60b. The first prism 100a and the second prism 100b at the rotors 60a and 60b independently rotate around different rotation axes 611a and 611b at different angular velocities.

Specifically, the first prism 100a and the second prism 100b may have different thicknesses in the direction perpendicular to the rotation axis 611a or the rotation axis 611b. That is, the first prism 100a and the second prism 100b may have different thicknesses.

The first prism 100a may include a first optical surface 101 and a second optical surface 102 that face each other and pass through the rotation axis 611. The first optical surface 101 and the second optical surface 102 may not be parallel with one another. The second prism 100b may have the same structure as the first prism 100a, and may also include a first optical surface 101 and a second optical surface 102 that face each other and pass through the rotation axes 611a and 611b. The first optical surface 101 and the second optical surface 102 may not be parallel with one another. In this embodiment, the first optical surface 101 and the second optical surface 102 may both be flat surfaces. Alternatively, the first optical surface 101 and the second optical surface 102 may not be flat surfaces, which is not limited by the present disclosure.

FIG. 12 and FIG. 13 show the light paths of the first prisms 100a, 100b at different time instances when the two rotors 60a, 60b rotate at different angular velocities.

As shown in FIG. 12, the incident light L1 may be incident on the second optical surface 102 of the second prism 100b along the direction of the rotation axis 611a or 611b. After passing the second prism 100b, the light L1 may be transmitted to the first prism 100a, and may exit from the first optical surface 101 to form an exit light L2. The exit light L2 may be located at the right side of the rotation axis 611. As shown in FIG. 13, at another time instance, because the locations of the first prism 100a and the second prism 100b are no longer the same, the exit light L3 is located at the left side of the rotation axis 611.

As can be seen from the above descriptions, through the two first prisms 100a and the second prisms 100b having different rotation velocities, the driving device may have exit lights of different angles at different time instances.

In some embodiments, the prism 100 may be a load fixed to the rotor assembly. In other embodiments, other elements may be used as the load. For example, optical elements such as lenses that may be configured to transmit the light, or cables, may also be used as the load to fix with the rotor assembly.

Figure 14A:
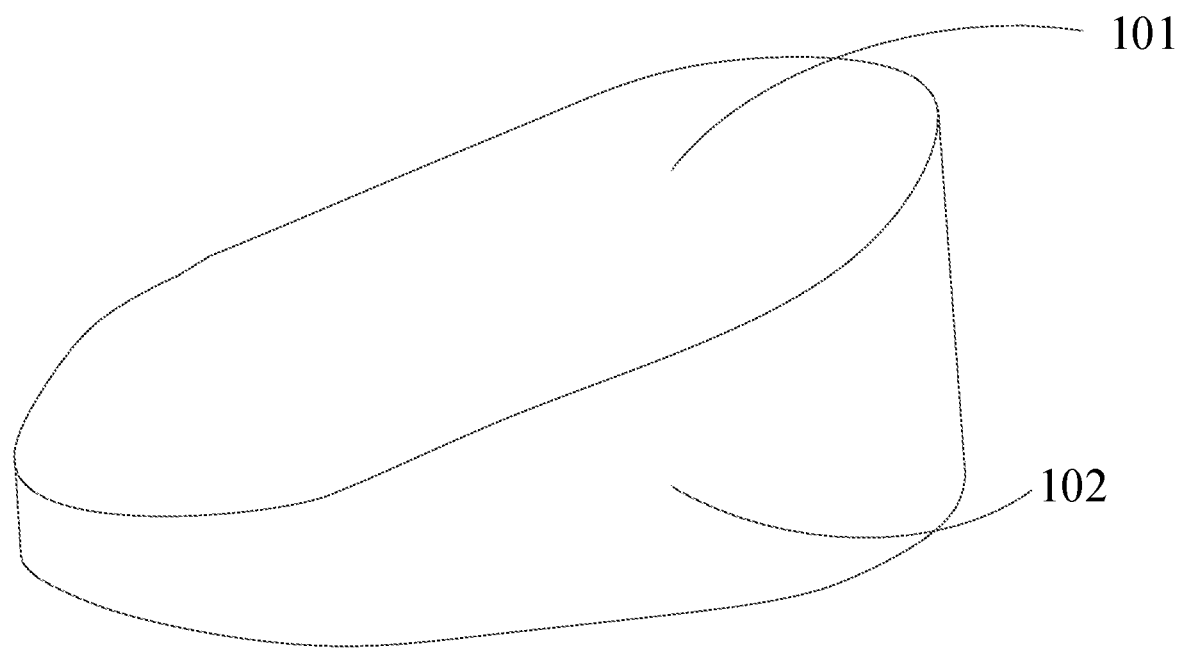
FIG. 14*a* is an illustration of a structure of a variation of a shape of a first prism shown in FIG. 12 and FIG. 13, according to an example embodiment.
Figure 14B:
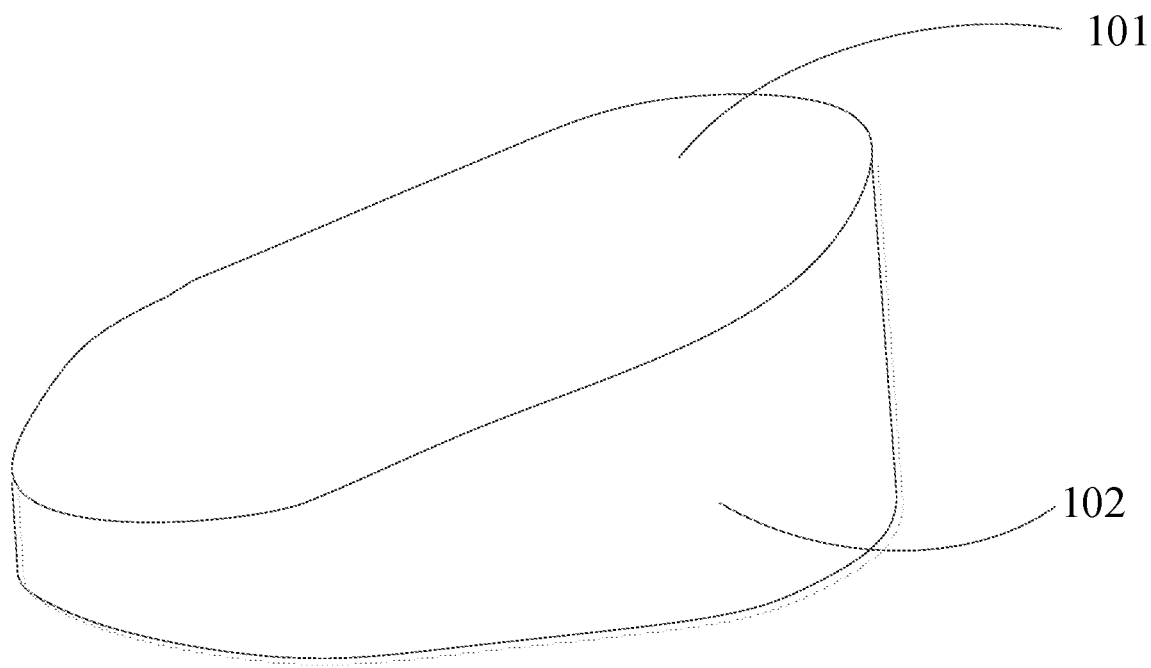
FIG. 14*b* is an illustration of a structure of a variation of a shape of a first prism shown in FIG. 12 and FIG. 13, according to another example embodiment.

FIG. 14a is a structural illustration of a variation of a shape of the first prism shown in FIG. 12 and FIG. 13. FIG. 14ba is a structural illustration of another variation of the first prism shown in FIG. 12 and FIG. 13. As shown in FIG. 14a and FIG. 14b, the first optical surface 101 and the second optical surface 102 may interpose with one another at different angles. In some embodiments, the first optical surface 101 or the second optical surface 102 may have an optical surface having a teeth shape.

Figure 15:
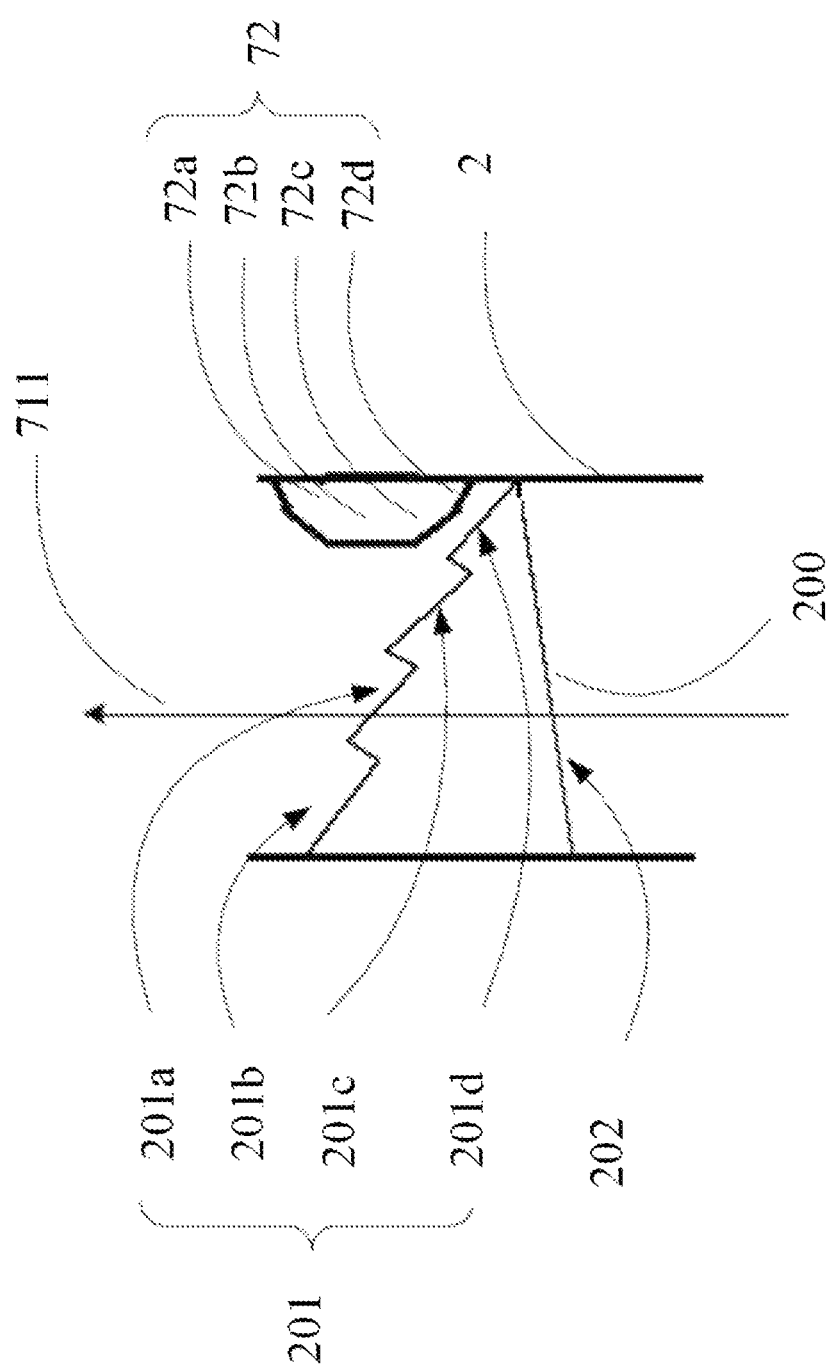
FIG. 15 is a schematic illustration of a partial cross-sectional view of a load when the load is a prism, according to an example embodiment.

FIG. 15 is a partial cross-sectional view of the structure of a load when the load is a prism, according to an embodiment of the present disclosure. As shown in the figure, a prism 200 may be fixed to an inner wall 712 of the hollow part of the rotor of the rotor assembly. The rotor may also include a counterweight block 72 disposed on the inner wall corresponding to the shape and location of the prism 200. When the shape of the prism 200 is not symmetric relative to the center of the rotation axis 711, the counterweight block 72 may be configured to keep balance regardless of whether the rotor assembly is rotating or is still, i.e., to improve the dynamic balance when the prism 200 rotates with the rotor assembly.

Specifically, the prism 200 may include a first optical surface 201 and a second optical surface 202 facing the first optical surface 201. The first optical surface 201 may include multiple sub-optical surfaces 201a, 201b, 201c, 201d having teeth shapes. The projections of the sub-optical surfaces 201a, 201b, 201c, 201d on the inner wall 712 along the direction perpendicular to the rotation axis 711 are continuous but may not overlap with one another.

Corresponding to the multiple sub-optical surfaces 201a, 201b, 201c, 201d of the first optical surface 201 of the prism 200, the counterweight block 72 may include corresponding sub-counterweight members 72a, 72b, 72c, 72d. The locations of the projections of the sub-counterweight members 72a, 72b, 72c, 72d in the direction perpendicular to the rotation axis 711 may be continuous.

The locations, weights, and volumes of the sub-counterweight members 72a, 72b, 72c, 72d on the inner wall 712 of the hollow part 71a may have the following corresponding relationship with the sub-optical surfaces 201a, 201b, 201c, 201d:

$$P_1 = \int \int \int_V \frac{Z - Z_2}{Z_1 - Z_2} \rho \vec{r} dV;$$

$$P_2 = \int \int \int_V \frac{Z_1 - Z}{Z_1 - Z_2} \rho \vec{r} dV;$$

Figure 16:
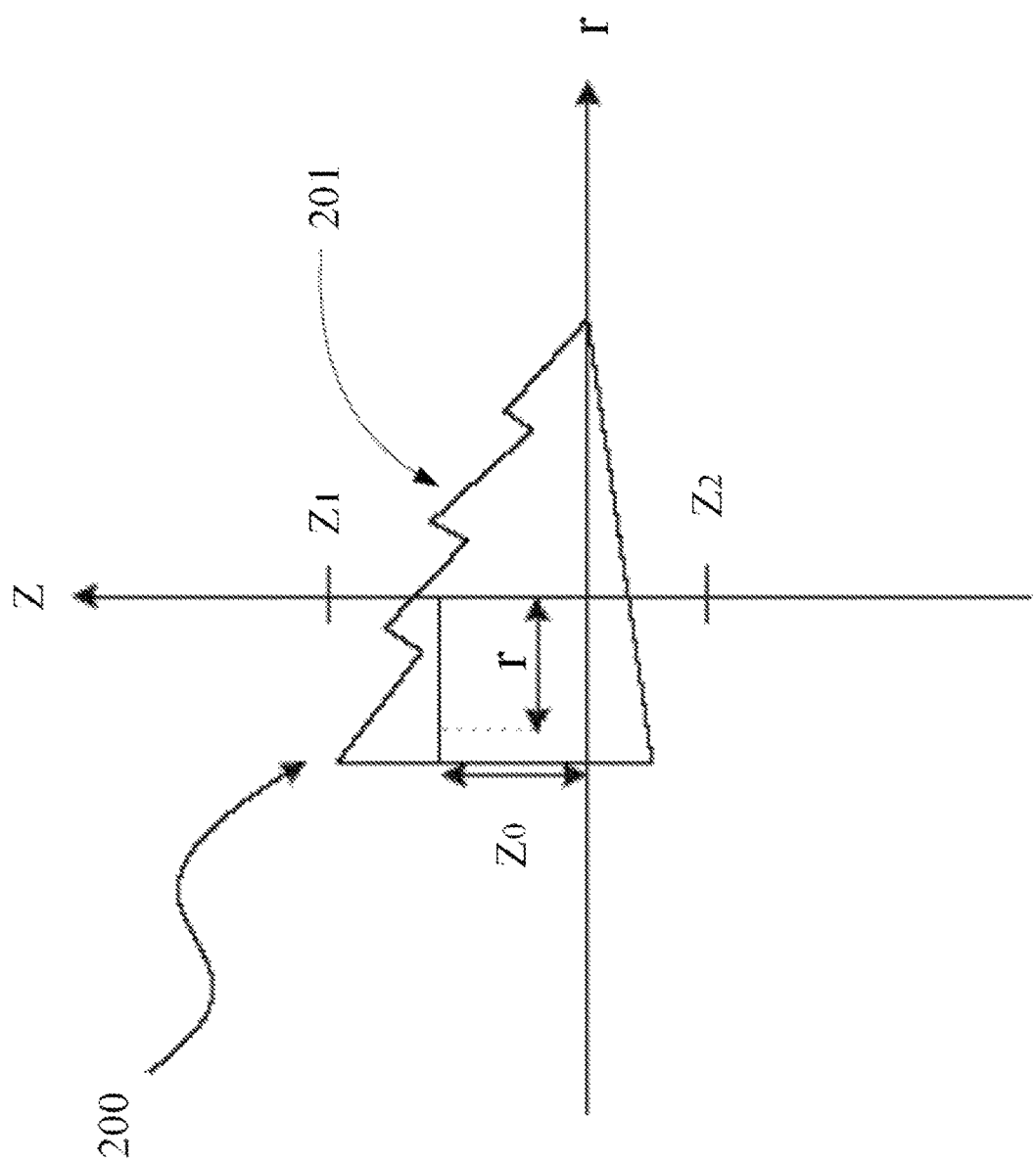
FIG. 16 is a schematic illustration of a structure of a side of another load when the load is a prism, according to an example embodiment.

FIG. 16 is a structural illustration of a side of another load when the load is a prism, according to an embodiment of the present disclosure. As shown in FIG. 16, $P_1$ may represent imbalanced amount of the mass-radius product decomposed onto the $Z_1$ surface, $P_2$ may represent imbalanced amount of the mass-radius product decomposed onto the $Z_2$ surface. V may represent the volume, Z may represent an integration variable, representing a height of the surface, and $\rho$ may represent a material density, and $\vec{r}$ may represent a direction of a mass point.

In some embodiments, the density of the counterweight block 72 may be greater than the density of the prism 200, such that the volume of the counterweight block 72 is relatively smaller, thereby reducing the effect on the light path of the prism 200.

In some embodiments, the structures of the prism 300 and the prism 200 may be substantially the same. The difference may be, in the prism 300, the first optical surface 301 and the second optical surface 302 that face one another may both be flat surfaces. The first optical surface 201 and the second optical surface 202 may pass through the rotation axis 711. When the shape of the prism 300 is not symmetric relative to the center of the rotation axis 711, the counterweight block 72 may be configured to maintain balance regardless of whether the rotor assembly is rotating or still, i.e., may improve the dynamic balance when the prism 200 and the rotor assembly rotate together. Specifically, corresponding to the first optical surface 301 and the second optical surface 302 of the prism 300, the counterweight block 72 may include corresponding sub-counterweight members whose locations of the projections at the prism 300 in the direction perpendicular to the rotation axis 711 are not continuous.

In some embodiments, the sub-counterweight members at different locations may have different shape, volume, and weight.

Figure 17:
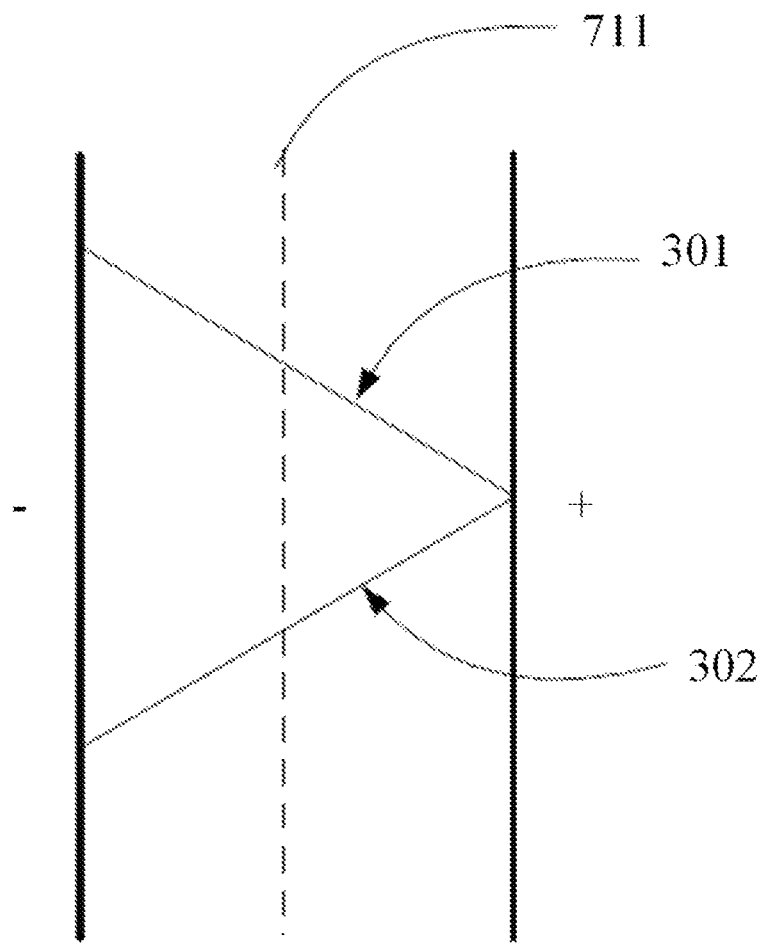
FIG. 17 is an illustration of a structure of another load when the load is a prism, according to an example embodiment.

FIG. 17 is a structural illustration of another load when the load is a prism, according to an embodiment of the present disclosure. As shown in FIG. 17, when the thickness of the prism 300 in the direction of the rotation axis 711 is relatively large, a notch may be formed at a corresponding location on the inner wall 712 of the hollow part. That is, counterweight block 72 may be used to increase the weight at the corresponding location of the corresponding rotor assembly 71, i.e., at the location indicated by "−," or be used to reduce the weight of the rotor assembly at the corresponding location, i.e., the location indicated by "+" in the figure. Alternatively, a notch position "−" may be formed at a periphery of a region of the prism 300 where the thickness is relatively large in a direction of the rotation axis 711, for improving he balance when the prism 300 rotates together with the rotor assembly 71.

In addition, to function to drive the rotor assembly, the stator may include ring-shaped coil winding groups or multiple winding groups symmetrically disposed relative to the rotation axis. When the coil winding groups are provided with an electric current, a magnetic field may be generated to drive the rotation of the rotor assembly.

In addition, the driving device may also include a housing 5. The housing 5 is typically located at the outermost side of the driving device, and may be fixedly connected with the positioning assembly 3, such that the rotor assembly 1 may be relatively fixed with respect to the housing 5 through the positioning assembly 3.

In the present embodiment, the driving device may include two rotor assemblies, a stator assembly, and a positioning assembly. Each rotor assembly may include a rotation axis and a rotor configured to rotate around the rotation axis. The rotor may include a hollow chamber. The chamber may include a hollow part configured to receive the load. The two rotor assemblies may include a first rotor assembly and a second rotor assembly. The rotation axis of the first rotor assembly and the rotation axis of the second rotor assembly may be parallel with one another. The rotor of the first rotor assembly may be at least partially embedded in the chamber of the rotor of the second rotor assembly. The stator assembly may be disposed at an outer side of the rotor assembly, and may be configured to drive a rotor of one of the first rotor assembly and the second rotor assembly to rotate. The rotor may cause a rotor of the other one of the first rotor assembly and the second rotor assembly to rotate. The positioning assembly may be located at an outer side of the rotor, and may be configured to limit the rotors to respectively rotate around the fixed rotation axes. As such, because the driving device includes only one stator assembly, and because the two rotors have portions that are embedded with one another, the overall structure of the driving device may be relatively simple, and the size of the appearance may be relatively small.

Figure 18:
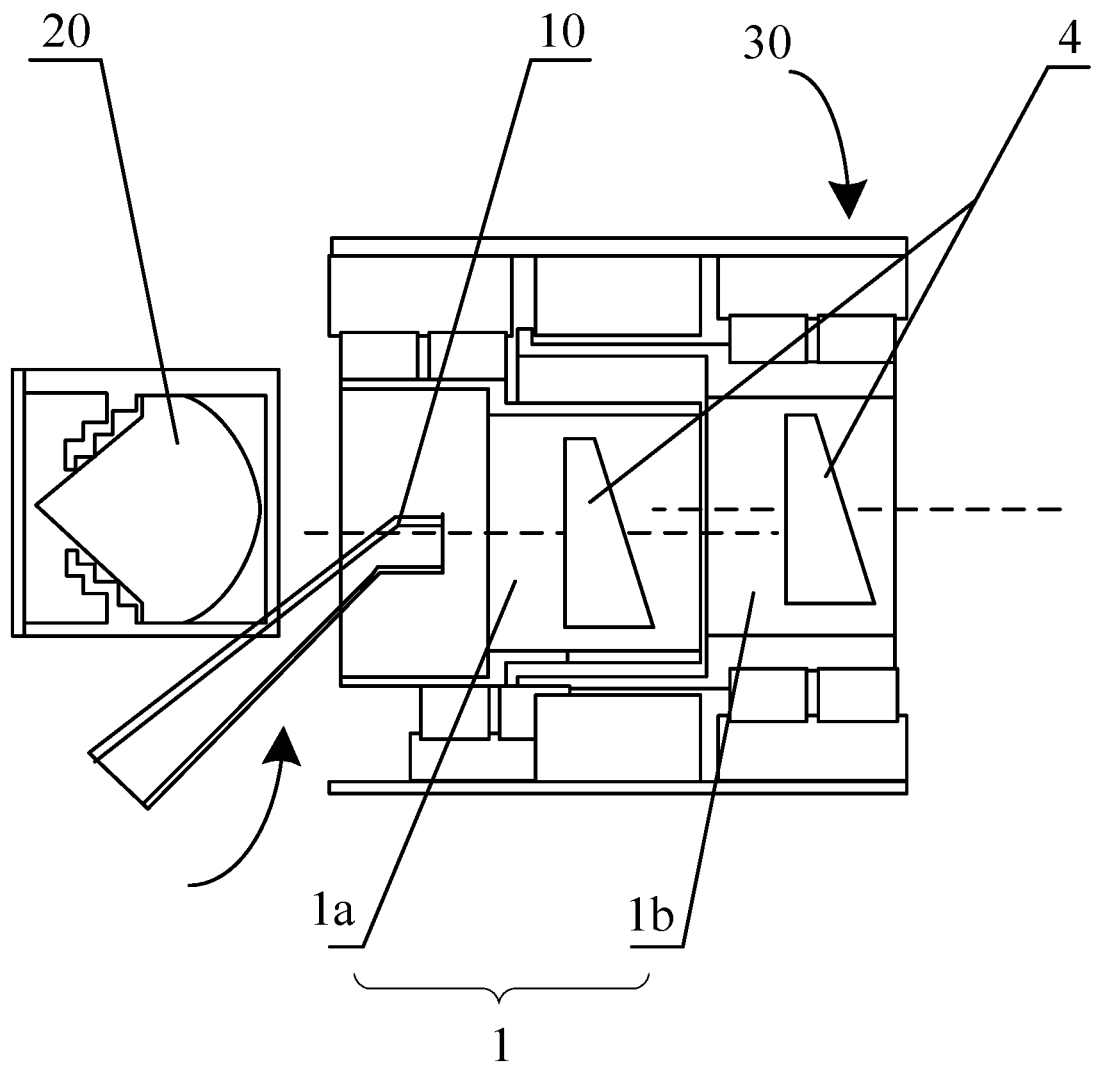
FIG. 18 is an illustration of a structure of a laser measurement device, according to an example embodiment.

FIG. 18 is a schematic illustration of a structure of a laser measurement device according to an embodiment of the present disclosure. As shown in FIG. 18, the laser measurement device of the present disclosure may include an emitter 10 for emitting a light beam, and a receiving unit (or a receiver) 20 configured for receiving the light beam, and a driving device 30 as described in any of the above embodiments. An end of the emitter 10 may face the driving device. The facing direction of the end of the emitter 10 may be parallel with a direction of a rotation axis of the driving device 30, such that the light beam is mitted to the load in the driving device 30.

Specifically, the emitter 10 of the laser measurement device may emit a directional light beam such as a laser beam, and the direction of the light beam may be parallel with the direction of the rotation axis of the driving device. When the light beam is emitted to the load 4 of the driving device 30, the load 4 may process the light beam, such as changing the irradiation direction of the light beam or the irradiation angle of the light beam, etc. After the light beam is transmitted by the load 4 from the laser measurement device, if the light beam encounters an object such as an obstacle, the light beam may be reflected back to the laser measurement device. The receiving unit 20 may receive the reflected light beam, and may measure a distance between the laser measurement device and the external object based on parameters such as the time difference or angle change between the exit light beam and the reflected light beam. For example, the distance from an object may be measured. As another example two-dimensional or three-dimensional survey may be performed on the external environment by the laser measurement device.

The load 4 of the driving device 30 may be an optical element. Because the driving device 30 includes the first rotor assembly 1a and the second rotor assembly 1b, and because the load 4 carried by the rotor 12a of the first rotor assembly 1a and the load 4 carried by the rotor 12b of the second rotor assembly 1b may have relative rotation, the light beam may be processed by the load 4, such as changing the angle of the light beam. As such, the light beams emitted by the laser measurement device may point to different directions, enabling operations such as scanning. After the laser measurement device receives the reflected light beam, accurate scanning of the obstacle may be performed based on parameter values of the light beam processed by the load at different angles.

In some embodiments, the emitter 10 may include a tilted tube 111. The tilted tube 111 may be obliquely disposed relative to the direction of the rotation axis of the driving device 30. As such, the tilted tube 111 may extend into the inside of the hollow chamber of the rotor of the rotor assembly of the driving device 30, thereby reducing the length of the entire laser measurement device in the axial direction along the rotation axis. The end of the emitter 10 may extend into the inside of the hollow chamber of the driving device 30, and still face a direction parallel with the rotation axis, to emit the light beam to the load 4.

Further, an acute angle may be formed between the tilted tube 111 and the direction of the rotation axis. Compared to the configuration manner in which the emitter is perpendicular to the rotation axis of the driving device or is parallel with the rotation axis of the driving device, the tilted tube 111 of the emitter 10 may effectively reduce the relative distance between the emitter 10 and the driving device 30, thereby reducing the length of the laser measurement device in the direction of the rotation axis of the driving device 30, such that the structure of the laser measurement device is more compact.

The receiving unit 20 for receiving the light beam reflected back to the laser measurement device may include a converging lens, a silicon photomultiplier, a bias circuit, and an amplifying circuit, etc. The light beam reflected back to the laser measurement device, after being converged to the receiving unit by the converging lens, may be amplified by the silicon photomultiplier to generate corresponding an electrical signal. After the electrical signal passes through the subsequent bias circuit and the amplifying circuit, a relatively high voltage signal may be output.

In addition, the laser measurement device may include optical elements such as collimating lenses to perform collimation on the light beam emitted by the emitter.

In the present disclosure, the laser measurement device may include the emitter for emitting the light beam, the receiving unit for receiving the light beam, and the driving device. An end of the emitter may face the driving device. A facing direction of the end of the emitter may be parallel with the direction of the rotation axis of the driving device, such that the light beam may be emitted to the load in the driving device. The driving device may include two rotor assemblies, a stator assembly, and a positioning assembly. Each rotor assembly may include a rotation axis and a rotor configured to rotate around the rotation axis. The rotor may include a hollow chamber. The chamber may include a hollow part for receiving the load. The two rotor assemblies may include a first rotor assembly and a second rotor assembly. The rotation axis of the first rotor assembly and the rotation axis of the second rotor assembly may be parallel with one another. The rotor of the first rotor assembly may be at least partially embedded in the chamber of the rotor of the second rotor assembly. The stator assembly may be surroundingly disposed at an outer side of the rotor assembly, and may be configured to drive a rotor of one of the first rotor assembly and the second rotor assembly to rotate. The rotor may cause a rotor of the other one of the first rotor assembly and the second rotor assembly to rotate. The positioning assembly may be located at an outer side of the rotors to limit the rotors to rotate around the respective fixed rotation axes. As such, because the driving device of the leaser measurement device only include one stator assembly, and the two rotor assemblies include portions that are embedded with one another, the structure of the laser measurement device is relatively simple, and the size of the appearance is relatively small.

In addition, the present disclosure provides a movable platform, including a platform body and the leaser measurement device described above in any of the above embodiments. The laser measurement device may be provided on the platform body.

In some embodiments, the movable platform may be at least one of an unmanned aircraft, a vehicle, and a remote controlled vehicle. The laser measurement device on the movable platform may be configured to measure the surrounding obstacle or environment, thereby performing obstacle avoidance operations or survey of the terrain.

In the present disclosure, the movable platform may include the platform body and the leaser measurement device. The laser measurement device may be provided on the movable platform. The laser measurement device may include an emitter configured to emit a light beam, a receiving unit configured to receive the light beam, and a driving drive. The driving device may include two rotor assemblies, a stator assembly, and a positioning assembly. Each rotor assembly may include a rotation axis and a rotor configured to rotate around the rotation axis. The rotor may include a hollow chamber. The chamber may include a hollow part configured to receive the load. The two rotor assemblies may include a first rotor assembly and a second rotor assembly. The rotation axis of the first rotor assembly and the rotation axis of the second rotor assembly may be parallel with one another. The rotor of the first rotor assembly may be at least partially embedded in the chamber of the rotor of the second rotor assembly. The stator assembly may be surroundingly disposed at an outer side of the rotors, and may be configured to limit the rotors to respectively rotate around the fixed rotation axes. As such, the driving device in the laser measurement device only includes one stator assembly, and the two rotor assemblies include portions that are embedded with one another. As such, the structure of the laser measurement device is relatively simple, and the size of the appearance is relatively small.

It should be understood, that the above embodiments are only used to explain the technical solutions of the present disclosure, and are not to limit the scope of the present disclosure. Although the present disclosure is described in detail with reference to the above embodiments, a person having ordinary skills in the art can appreciate that the technical solutions reflected in the above embodiments may be modified, or, some or all of the technical features may be equivalently substituted. Such modification or substitution do not render the corresponding technical solutions fall outside of the scope of the technical solutions of the various embodiments of the present disclosure.

What is claimed is:

1. A driving device, comprising:
    two rotor assemblies;
    a stator assembly; and
    a positioning assembly,
    wherein each of the two rotor assemblies comprises a rotation axis and a rotor configured to rotate around the rotation axis,
    wherein the rotor comprises a hollow chamber having a hollow part configured to receive a load,
    wherein the two rotor assemblies comprise a first rotor assembly and a second rotor assembly, a rotation axis of the first rotor assembly is parallel with a rotation axis of the second rotor assembly, a rotor of the first rotor assembly is at least partially embedded in a chamber of a rotor of the second rotor assembly,
    wherein the stator assembly is surroundingly disposed at an outer side of at least one of the two rotor assemblies and is configured to drive a rotor of one of the first rotor assembly and the second rotor assembly,
    wherein the rotor driven by the stator assembly is configured to cause a rotor of the other one of the first rotor assembly and the second rotor assembly to rotate, and
    wherein the positioning assembly is located at an outer side of the rotors of the two rotor assemblies, and is configured to limit the rotors to respectively rotate around corresponding fixed rotation axes.

2. The driving device of claim 1, wherein the positioning assembly comprises a first positioning assembly and a second positioning assembly, the first positioning assembly and the second positioning assembly are respectively located at an outer side of a corresponding rotor to limit the corresponding rotor to rotate around a corresponding rotation axis.

3. The driving device of claim 2, wherein the rotor of the first rotor assembly and the rotor of the second rotor assembly are configured to transmit through contact, and the rotor of the first rotor assembly and the rotor of the second rotor assembly have the same linear velocity at a contacting point.

4. The driving device of claim 3, wherein a friction pad is disposed between the rotor of the first rotor assembly and the rotor of the second rotor assembly, and the rotor of the first rotor assembly and the rotor of the second rotor assembly are transmissively connected through a friction force of the friction pad.

5. The driving device of claim 3, wherein the rotor of the first rotor assembly and the rotor of the second rotor assembly are configured with meshing transmission at the contracting point.

6. The driving device of claim 1,
    wherein the stator assembly comprises a ring-shaped stator surroundingly disposed at an outer side of at least one of the rotors of the two rotor assemblies, or
    wherein the stator assembly comprises at least two separately disposed stators that are axially symmetric or center symmetric relative to the rotation axis of the first rotor assembly or the rotation axis of the second rotor assembly.

7. The driving device of claim 2, wherein the rotor of the first rotor assembly comprises a first rotation member that is disposed in an axial direction and embedded in the chamber of the second rotor assembly, and a second rotation member that is not embedded in the chamber.

8. The driving device of claim 7,
    wherein the first positioning assembly is located at an outer side of the second rotation member,
    wherein the second positioning assembly is located at an inner side of the stator assembly, and is disposed separate from the stator assembly, and
    wherein the second positioning assembly and the stator assembly are orderly disposed in an axial direction of the rotation axis of the first rotor assembly or the rotation axis of the second rotor assembly, and the first positioning assembly and the second positioning assembly are respectively located at two sides of the stator assembly in the axial direction.

9. The driving device of claim 8,
    wherein the second positioning assembly comprises at least two positioning members, the at least two positioning members are disposed to be axially symmetric or center symmetric relative to the rotation axis of the first rotor assembly or the rotation axis of the second rotor assembly, and
    wherein the second positioning assembly comprises a ring-shaped positioning member.

10. The driving device of claim 8, wherein the stator assembly comprises at least two stators, the second positioning assembly comprises at least two positioning members, the at least two stators and the at least two positioning members are at least partially alternately disposed around the rotation axis of the first rotor assembly or the rotation axis of the second rotor assembly.

11. The driving device of claim 10,
    wherein a stator is disposed between two adjacent positioning members, and/or
    wherein a positioning member is disposed between two adjacent stators.

12. The driving device of claim 1, wherein each rotor comprises a magnet yoke and at least one magnet fixedly connected with the magnet yoke, the at least one magnet surroundingly disposed at an outer side of the magnet yoke.

13. The driving device of claim 12,
    wherein the at least one magnet is disposed at an outer circumferential surface of the magnet yoke, and
    wherein the at least a portion of the magnet yoke is located at an inner side of the stator assembly.

14. The driving device of claim 1, wherein each rotor comprises at least one magnet, the at least one magnet and the stator assembly are orderly disposed in a direction along the rotation axis of the first rotor assembly or the rotation axis of the second rotor assembly.

15. The driving device of claim 14, wherein each rotor comprises a magnet yoke coupled with the at least one magnet, the magnet yoke comprises a first portion and a second portion coupled with the first portion, and the first portion is coupled with the at least one magnet.

16. The driving device of claim 15,
    wherein the first portion is configured to extend in an axial direction of the rotation axis of the first rotor assembly or an axial direction of the rotation axis of the second rotor assembly,
    wherein the second portion is configured to extend in a radial direction of the rotation axis of the first rotor assembly or a radial direction of the rotation axis of the second rotor assembly, and wherein the first portion of the magnet yoke forms the hollow part.

17. The driving device of claim 15,
wherein the second portion is configured to extend a side of the stator assembly facing the rotation axis of the first rotor assembly or the rotation axis of the second rotor assembly, and
wherein the second portion of the magnet yoke forms the hollow part, or the first portion of the magnet yoke forms the hollow part.

18. The driving device of claim 1,
wherein each rotor comprises at least one magnet, the at least one magnet is located at an inner side of the stator assembly, and
wherein each rotor comprises a magnet yoke coupled with the at least one magnet, the magnet yoke comprises a first portion configured to surround the rotation axis of the first rotor assembly or the rotation axis of the second rotor assembly, and a second portion coupled with the first portion, and
wherein the first portion is coupled with the at least one magnet, and the second portion is configured to extend to a side of the positioning assembly facing the rotation axis of the first rotor assembly or the rotation axis of the second rotor assembly.

19. A laser measurement device, comprising:
an emitter configured to emit a light beam;
a receiving unit configured to receive the light beam; and
a driving device comprising:
  two rotor assemblies;
  a stator assembly; and
  a positioning assembly,
  where each of the two rotor assemblies comprises a rotation axis and a rotor configured to rotate around the rotation axis,
  wherein the rotor comprises a hollow chamber having a hollow part configured to receive a load,
  wherein the two rotor assemblies comprise a first rotor assembly and a second rotor assembly, a rotation axis of the first rotor assembly is parallel with a rotation axis of the second rotor assembly, a rotor of the first rotor assembly is at least partially embedded in a chamber of a rotor of the second rotor assembly,
  wherein the stator assembly is surroundingly disposed at an outer side of at least one of the two rotor assemblies and is configured to drive a rotor of one of the first rotor assembly and the second rotor assembly, and
  wherein the rotor driven by the stator assembly causes a rotor of the other one of the first rotor assembly and the second rotor assembly to rotate,
  wherein the positioning assembly is located at an outer side of the rotors of the two rotor assemblies, and is configured to limit the rotors to respectively rotate around corresponding fixed rotation axes,
wherein an end of the emitter is configured to face the driving device, and a facing direction of the end of the emitter is parallel with a direction of the rotation axis of the first rotor assembly or the rotation axis of the second rotor assembly of the driving device, to transmit the light beam to the load of the driving device.

20. A movable platform, comprising:
a platform body; and
a laser measurement device mounted on the platform body, comprising:
  an emitter configured to emit a light beam;
  a receiving unit configured to receive the light beam; and
  a driving device comprising:
    two rotor assemblies;
    a stator assembly; and
    a positioning assembly,
    where each of the two rotor assemblies comprises a rotation axis and a rotor configured to rotate around the rotation axis,
    wherein the rotor comprises a hollow chamber having a hollow part configured to receive a load,
    wherein the two rotor assemblies comprise a first rotor assembly and a second rotor assembly, a rotation axis of the first rotor assembly is parallel with a rotation axis of the second rotor assembly, a rotor of the first rotor assembly is at least partially embedded in a chamber of a rotor of the second rotor assembly,
    wherein the stator assembly is surroundingly disposed at an outer side of at least one of the two rotor assemblies and is configured to drive a rotor of one of the first rotor assembly and the second rotor assembly, and
    wherein the rotor driven by the stator assembly causes a rotor of the other one of the first rotor assembly and the second rotor assembly to rotate,
    wherein the positioning assembly is located at an outer side of the rotors of the two rotor assemblies, and is configured to limit the rotors to respectively rotate around corresponding fixed rotation axes,
  wherein an end of the emitter is configured to face the driving device, and a facing direction of the end of the emitter is parallel with a direction of the rotation axis of the first rotor assembly or the rotation axis of the second rotor assembly of the driving device, to transmit the light beam to the load of the driving device.

* * * * *